(12) United States Patent
Schuler et al.

(10) Patent No.: US 9,998,895 B1
(45) Date of Patent: Jun. 12, 2018

(54) APPARATUS AND METHOD FOR REAL-TIME PUBLIC SAFETY EVIDENTIARY DATA COLLECTION

(71) Applicant: MOTOROLA SOLUTIONS, INC., Chicago, IL (US)

(72) Inventors: Francesca Schuler, Palatine, IL (US); Katrin Reitsma, Chicago, IL (US); Adam C. Lewis, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/897,828

(22) Filed: Feb. 15, 2018

Related U.S. Application Data

(63) Continuation-in-part of application No. 15/635,706, filed on Jun. 28, 2017.

(51) Int. Cl.
| | | |
|---|---|---|
| *H04B 7/00* | (2006.01) | |
| *H04W 4/08* | (2009.01) | |
| *H04W 48/02* | (2009.01) | |
| *G06F 21/32* | (2013.01) | |
| *H04L 29/08* | (2006.01) | |
| *H04W 4/02* | (2018.01) | |
| *H04W 12/08* | (2009.01) | |

(52) U.S. Cl.
CPC .............. *H04W 4/38* (2018.02); *G06F 21/32* (2013.01); *H04L 67/12* (2013.01); *H04W 4/02* (2013.01); *H04W 4/08* (2013.01); *H04W 4/90* (2018.02); *H04W 48/02* (2013.01); *H04W 12/08* (2013.01)

(58) Field of Classification Search
CPC ........... H04W 4/38; H04W 4/90; H04W 4/02; H04W 4/08; H04W 48/02; H04W 12/08; H04L 67/12; G06F 21/32
See application file for complete search history.

(56) References Cited

U.S. PATENT DOCUMENTS

| 8,116,243 B2 | 2/2012 | Zhiying et al. |
| 8,977,373 B2 | 3/2015 | Felty et al. |
| 8,995,946 B2 | 3/2015 | Miller |

(Continued)

OTHER PUBLICATIONS

Ibarguengoytia, Pablo H., et al. "Real Time Intelligent Sensor Validation", IEE Transactions on Power Systems, vol. 16, No. 4, Nov. 2001, pp. 770-775.

(Continued)

*Primary Examiner* — Dominic Rego
(74) *Attorney, Agent, or Firm* — Perry + Currier, Inc.

(57) ABSTRACT

A device, system and method for sharing sensor data is provided. A request to access sensor data is received at a receiver device, from a requestor device, the sensor data acquired by sensors associated with the receiver device. The receiver device determines a status of the receiver device. The receiver device determines, from the status of the receiver device, a subset of the sensor data to share with the requestor device. The receiver device determines one or more override contextual conditions associated with one or more of the requestor device and the receiver device. When the one or more override contextual conditions meets one or more override threshold conditions, the receiver device causes the subset of the sensor data to be shared with the requestor device.

20 Claims, 20 Drawing Sheets

(56) References Cited

U.S. PATENT DOCUMENTS

| | | | |
|---|---|---|---|
| 9,225,793 B2 | 12/2015 | Dutta et al. | |
| 9,306,965 B1 | 4/2016 | Grossman et al. | |
| 9,373,014 B1 | 6/2016 | Mehranfar | |
| 9,794,755 B1 | 10/2017 | South | |
| 2005/0172047 A1* | 8/2005 | Pettey | G06F 13/12 |
| | | | 710/20 |
| 2006/0230270 A1* | 10/2006 | Goffin | G08B 25/10 |
| | | | 713/173 |
| 2008/0042825 A1 | 2/2008 | Denny et al. | |
| 2009/0043920 A1* | 2/2009 | Kuris | G06F 13/18 |
| | | | 710/28 |
| 2012/0115494 A1 | 5/2012 | Christensen et al. | |
| 2015/0145696 A1 | 5/2015 | Seo et al. | |
| 2015/0254463 A1* | 9/2015 | Ryhorchuk | G06F 21/602 |
| | | | 713/156 |
| 2015/0319176 A1 | 11/2015 | Yahalom et al. | |
| 2016/0150366 A1 | 5/2016 | Miller et al. | |
| 2017/0105057 A1* | 4/2017 | Stamatakis | H04Q 9/00 |
| 2017/0358151 A1* | 12/2017 | Koons | G07C 5/08 |
| 2018/0037193 A1* | 2/2018 | Penilla | B60R 25/102 |

OTHER PUBLICATIONS

Adam C. Lewis, et al., "Apparatus and Method for Real-Time Public Safety Evidentiary Data Collection", U.S. Appl. No. 15/635,706, filed Jun. 28, 2017.

\* cited by examiner

APPARATUS AND METHOD FOR REAL-TIME PUBLIC SAFETY EVIDENTIARY DATA COLLECTION

CROSS-REFERENCE TO RELATED APPLICATIONS

The present application is a continuation-in-part of the following U.S. application commonly owned with this application by Motorola Solutions Incorporated: Ser. No. 15/635,706, filed Jun. 28, 2017, titled "APPARATUS AND METHOD FOR REAL-TIME PUBLIC SAFETY EVIDENTIARY DATA COLLECTION", the entire contents of which being incorporated herein by reference

BACKGROUND OF THE INVENTION

Members of an organization may be assigned to a talkgroup so that all members in the talkgroup can share information, using communication devices and the like. For example, firefighters in one or more departments may be assigned to a firefighter talkgroup and police officers in one or more departments may be assigned to a police talkgroup. Public safety responders affiliated with multiple talkgroups may respond to an incident. In some cases, only some responders in a given talkgroup may be assigned to the incident. In these cases, the unassigned responders in the talkgroup may still be able to monitor the talkgroup communications but are unable to upload data related to the incident. However, the unassigned responders may have relevant data associated with the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
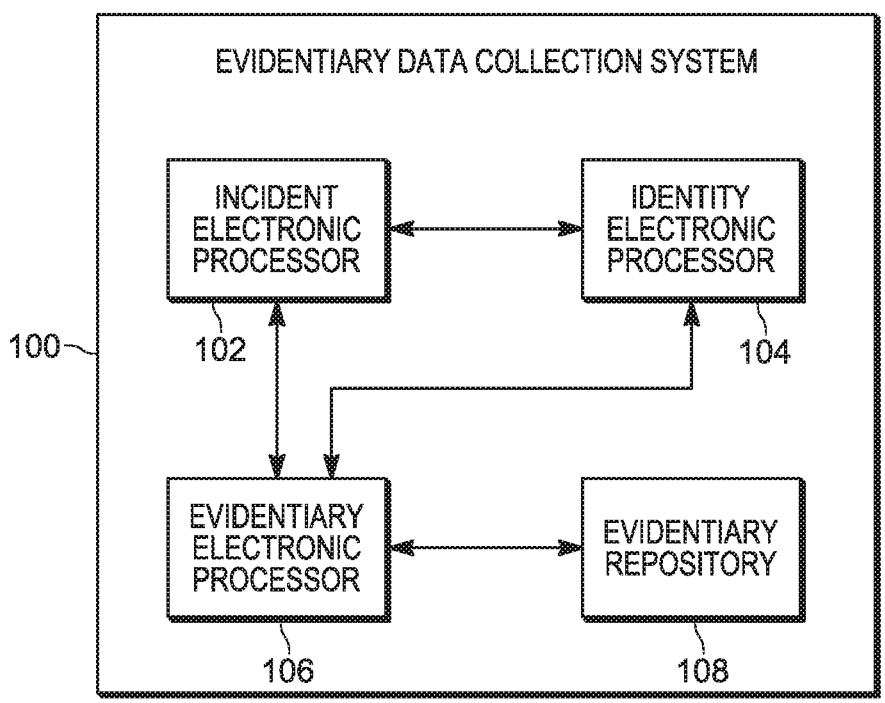
FIG. 1 is a block diagram of an evidentiary data collection system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for collecting incident data. An evidentiary electronic processor receives identifying data associated with respective ones of a plurality of communication devices associated with an incident. The evidentiary electronic processor determines an assignment status of each communication device using the respective identifying data. The assignment status indicates that a communication device is one of assigned to the incident, unassigned to the incident and associated with a first profile that is relevant to the incident, or unassigned to the incident and associated with a second profile that is irrelevant to the incident. The evidentiary electronic processor receives sensor data associated with the incident from a sending communication device out of the plurality of communication devices. The evidentiary electronic processor processes the sensor data based on a respective assignment status associated with the sending communication device.

Another aspect of the specification provides a method comprising: receiving, at a receiver device, from a requestor device, a request to access sensor data acquired by sensors associated with the receiver device; determining, at the receiver device, a status of the receiver device; determining, at the receiver device, from the status of the receiver device, a subset of the sensor data to share with the requestor device; determining, at the receiver device, one or more override contextual conditions associated with one or more of the requestor device and the receiver device; and when the one or more override contextual conditions meets one or more override threshold conditions, causing the subset of the sensor data to be shared with the requestor device.

Another aspect of the specification provides a receiver device comprising: an electronic processor communicatively coupled to a communications unit, the electronic processor configured to: receive, via the communications unit, from a requestor device, a request to access sensor data acquired by sensors associated with the receiver device; determine a status of the receiver device; determine, from the status of the receiver device, a subset of the sensor data to share with the requestor device; determine one or more override contextual conditions associated with one or more of the requestor device and the receiver device; and when the one or more override contextual conditions meets one or more override threshold conditions, cause the subset of the sensor data to be shared with the requestor device.

FIG. 1 is a block diagram of an evidentiary data collection system used in accordance with some embodiments. Evidentiary data collection system 100 includes a plurality of electronic processors including an incident electronic processor 102 (also described herein as a first electronic processor 102), an identity electronic processor 104 (also described herein as a second electronic processor 104), an evidentiary electronic processor 106 (also described herein as a third electronic processor 106) and an evidentiary repository 108. Evidentiary repository 108 is configured to store relevant and evidentiary data uploaded by public safety responders and related to an incident. Information may be uploaded into evidentiary repository 108 by public safety responders using one or more communication devices (for example, devices 202-230 shown in FIG. 2). The communication devices may be, for example, portable two-way radios, mobile radios or devices including sensors that are configured to communicate with each other and/or with components of evidentiary data collection system 100.

Incident electronic processor 102 may be a computer assisted dispatcher or another system controller or dispatcher configured to assign public safety responders to an incident. In assigning public safety responders to the incident, incident electronic processor 102 is further configured to associate an assignment status to respective public safety responders, wherein the assignment status indicates that a public safety responder is assigned to the incident or unassigned to the incident. In associating a public safety responder with an assignment status, the respective communication device(s) of the public safety responder are also associated with the assignment status. Incident electronic processor 102 may form an incident group including the public safety responders assigned to the incident, wherein public safety responders from different talkgroups may be assigned to the incident group and the talkgroups assigned to the incident may be from different agencies. Each talkgroup is a communication group wherein all members in the talkgroup may use assigned communication devices to share information with each other.

Identity electronic processor 104 is configured to create and issue access tokens to public safety responders that have been successfully authenticated. Evidentiary electronic processor 106 is configured to determine the assignment statuses of public safety responders and validate the access tokens and the assignment statuses of public safety responders attempting to upload information to evidentiary repository 108. Evidentiary electronic processor 106 is also configured to determine whether or not information presented by public safety responders is to be uploaded into evidentiary repository 108. Evidentiary repository 108 and processors 102-106 may be implemented, for example, in a single device within evidentiary data collection system 100 or may be distributed in multiple devices (for example, servers and/or communication devices).

Figure 2:
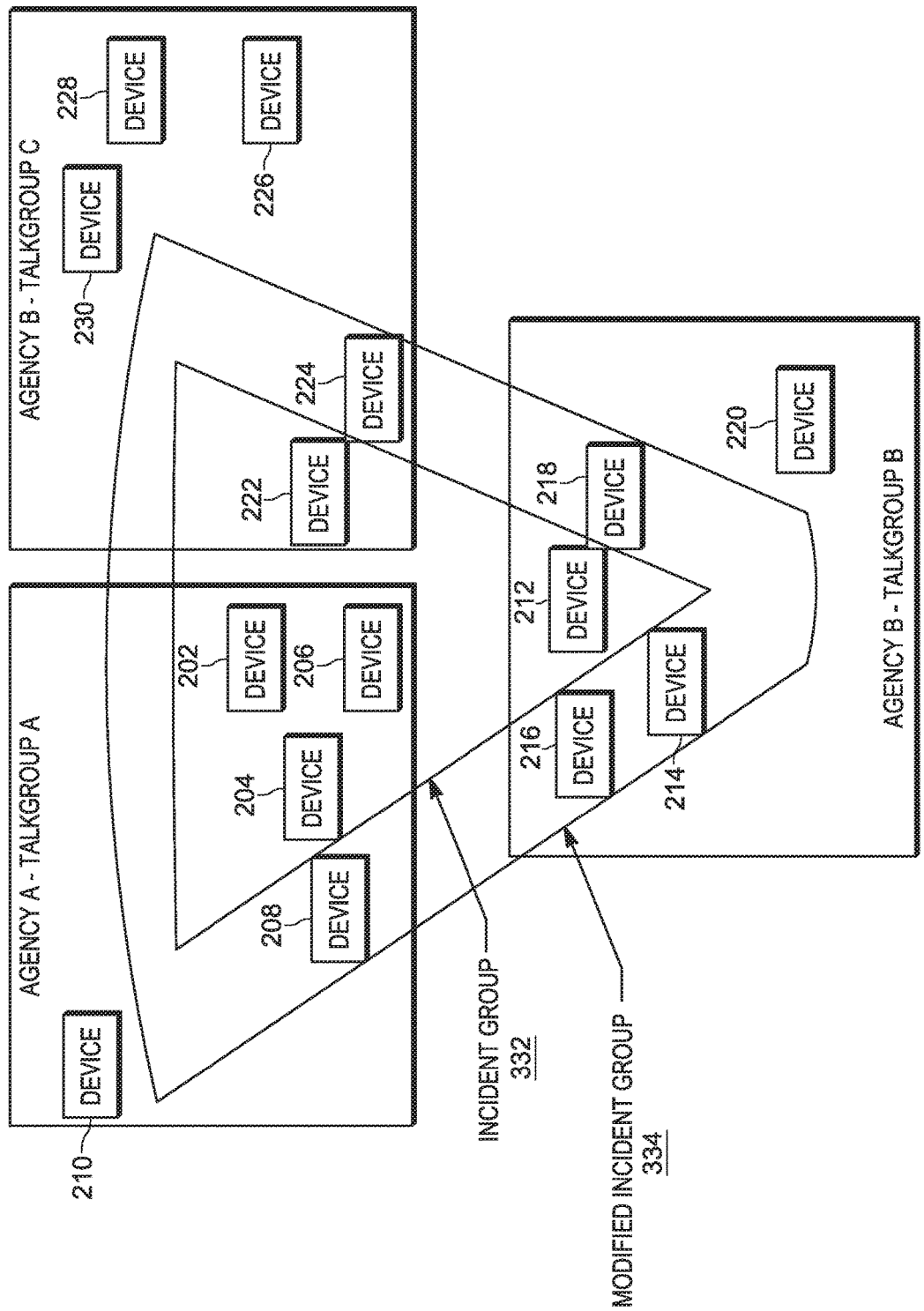
FIG. 2 is a block diagram depicting talkgroups associated with an incident in accordance with some embodiments.

FIG. 2 is a block diagram depicting talkgroups associated with an incident in accordance with some embodiments. Communication devices 202-210, associated with public safety responders in agency A, may be assigned to talkgroup A; communication devices 212-220, associated with public safety responders in agency B, may be assigned to talkgroup B; and communication devices 222-230, also associated with public safety responders in agency B, may be assigned to talkgroup C.

Depending on one or more criteria, for example, depending on the geographic proximity of public safety responders to the incident, incident electronic processor 102 may assign public safety responders associated with communication devices 202-206 from talkgroup A, public safety responder associated with communication device 212 from talkgroup B and public safety responder associated with communication device 222 from talkgroup C to an incident group 332.

Incident electronic processor 102 is configured to send identifying data associated with respective communication devices in talkgroups A, B and/or C to evidentiary electronic processor 106. For example, incident electronic processor 102 may send, to evidentiary electronic processor 106, one or more of identifiers associated with each communication device in talkgroups A, B and/or C, the assignment statuses of the public safety responder associated with each communication device in talkgroups A, B and/or C (i.e., whether or not an associated public safety responder is assigned to incident group 332 or unassigned), an identifier for the incident, the type of the incident, the geographic location of the incident, the geographic location of each public safety responder in talkgroups A, B and/or C, capabilities of the communication devices associated with public safety responders in talkgroups A, B and/or C, and/or the identifiers of the public safety responders, talkgroups, roles and/or agencies associated with the incident.

Based on information received from incident electronic processor 102, evidentiary electronic processor 106 may determine whether the unassigned public safety responders are associated with a first profile or a second profile, wherein the first profile may include information considered relevant to the incident and the second profile may include information considered irrelevant to the incident. For example, evidentiary electronic processor 106 may determine whether one or more unassigned public safety responders are within close geographic proximity to an incident area and/or are associated with assignments or roles that may include information considered relevant to the incident, and if so, evidentiary electronic processor 106 may associate those unassigned public safety responders with the first profile.

Evidentiary electronic processor 106 may also determine whether one or more unassigned public safety responders are associated with assignments, roles or geographic locations that are not likely to include information considered relevant to the incident, and if so, may associate those public safety responders with the second profile. The first and second profiles may specify, for example, a public safety responder's assignment, role or geographic location.

Consider, for example, that public safety responders associated with communication device 208 from talkgroup A, communication devices 214-218 from talkgroup B and communication device 224 from talkgroup C are not assigned to incident group 332 but are associated with the first profile because of, for example, their geographic proximity to the incident area. In order to enable the public safety responders associated with these communication devices to upload information that is relevant to the incident to evidentiary repository 108, evidentiary electronic processor 106 may form a modified incident group 334 including the public safety responders associated with communication device 208 from talkgroup A, communication devices 214-218 from talkgroup B and communication device 224 from talkgroup C. Public safety responders associated with communication devices 210, 220 and 226-230, although still a part of talkgroups A, B and C, remain unassigned and are associated with the second profile because of, for example, their geographic proximity to the incident area. Evidentiary electronic processor 106 may therefore determine that these public safety responders are not likely to upload relevant data for the incident to evidentiary repository 108.

Using the identifying data received from incident electronic processor 102 and the association of unassigned communication devices to the first profile or the second profile, evidentiary electronic processor 106 may determine the assignment status of each public safety responder in talkgroups A, B and C, i.e., evidentiary electronic processor 106 may determine whether or not each public safety responder associated with one or more communication devices is assigned to incident group 332, to modified incident group 334, or is unassigned. Evidentiary electronic processor 106 may send the assignment statuses associated with the communication devices to the incident electronic processor 102 and incident electronic processor 102 may send information to the communication devices informing a communication device of its assignment status. Subsequent to receiving the assignment statuses from evidentiary electronic processor 106, incident electronic processor 102 and/or the communication devices receiving information from incident electronic processor 102 may request an access token, wherein the information a communication device receives from incident electronic processor 102 may include the assignment status of the communication device and access information on how the communication device assigned to the incident group 332 or the modified incident group 334 may access identity electronic processor 104 to request the access token. The access information may include, for example, an address of identity electronic processor 104. The access token is associated with a public safety responder and an affiliated agency and the access token is granted to a public safety responder that is associated with incident group 332 or modified incident group 334. The access token authorizes an application client on a communication device to upload data to evidentiary repository 108 on behalf of an associated public safety responder.

If an access token is to be generated for members of a talkgroup or organization assigned to incident group 332, incident electronic processor 102 identifies public safety responders in that talkgroup or organization that are assigned to incident group 332, generates incident group information for those public safety responders and transmits the incident group information to the associated communications devices. If an access token is to be generated for members of a talkgroup or organization assigned to modified incident group 334, incident electronic processor 102 identifies public safety responders in that talkgroup or organization that are assigned to modified incident group 334, generates modified group information for those public safety responders and transmits the modified group information to the associated communications devices. In generating the incident group information and/or the modified group information, incident electronic processor 102 signs a grant with its private key, wherein the grant is a message provided to the communication devices associated with the incident group information and/or the modified group information and enables these devices to obtain the access token from identity electronic processor 104

In cases where the access token is for incident group 332, incident electronic processor 102 transmits the signed grant and the address for identity electronic processor 104 to communication devices associated with public safety responders in incident group 332 in the talkgroup or organization. The address for identity electronic processor 104 may be, for example, an Internet Protocol (IP) or a uniform resource locator (URL) associated with identity electronic processor 104. Similarly, in cases where the access token is for modified incident group 334, incident electronic processor 102 transmits the signed grant and the address for identity electronic processor 104 to communication devices associated with public safety responders in modified incident group 334 in the talkgroup or organization.

A communication device receiving the signed grant creates a token request and sends the token request to identity electronic processor 104, using the address for identity electronic processor 104 received from incident electronic processor 102. Based on the token request, identity electronic processor 104 generates an access token for incident group 332 or for modified incident group 334 for the talkgroup or organization and transmits the access token to the requesting communication device. The access token authorizes application clients on communication devices in incident group 332 or modified incident group 334 in the talkgroup or organization to upload information to evidentiary repository 108.

Communication devices 202-230 may upload sensor data to evidentiary repository 108 by sending the sensor data to evidentiary electronic processor 106. Examples of sensor data sent to evidentiary electronic processor 106 may include data generated on communication devices 202-230 including, for example, videos, photos, audio recordings or other data generated on communication devices 202-230 or data generated or obtained from sensors on communication devices 202-230. The sensor data may also include data obtained by communication devices 202-230 from external sources. For example, the sensor data may include a video feed from an external source received by a communication device. The sensor data may be sent with meta-data including, for example, the talkgroup identifier, location information, the incident identifier, an agency identifier, an associated public safety responder identifier and additional available context information. In some embodiments, evidentiary electronic processor 106 may generate the meta-data, if it is not sent with the sensor data.

A sending communication device uploading the sensor data to evidentiary repository 108 may transmit the access token with the sensor data and the meta-data. Subsequent to receiving the sensor data, evidentiary electronic processor 106 may determine if the sensor data is transmitted with a valid access token. If evidentiary electronic processor 106 determines that sensor data includes a valid access token, evidentiary electronic processor 106 is configured to determine that the sending communication device is authorized to upload relevant sensor data for the incident. Evidentiary electronic processor 106 may further determine the evidentiary level of the sensor data, for example, by calculating an evidentiary reliability index for the sensor data. The evidentiary reliability index may be calculated using, for example, hardware or software properties associated with the device uploading the sensor data and/or hardware or software properties associated with other devices uploading related and relevant sensor data. Evidentiary electronic processor 106 may determine that the sensor data is at an evidentiary level if the calculated evidentiary reliability index is above a first threshold, wherein the relevance for sensor data associated with a calculated evidentiary reliability index above the first threshold may be considered higher than the relevance for sensor data associated with a calculated evidentiary reliability index below the first threshold.

Evidentiary electronic processor 106 may process the sensor data from authorized or unauthorized communication devices based on the assignment status of the sending communication device and one or more predefined policies. For example, if evidentiary electronic processor 106 calculates the evidentiary reliability index, evidentiary electronic processor 106 may upload the meta-data, the sensor data and the evidentiary reliability index to evidentiary repository 108. If evidentiary electronic processor 106 does not calculate the evidentiary reliability index and determines that a communication device is authorized to upload the sensor data for the incident, evidentiary electronic processor 106 may upload the meta-data and the sensor data to evidentiary repository 108.

In another example, if evidentiary electronic processor 106 determines that the sending communication device is not authorized to upload sensor data for the incident, evidentiary electronic processor 106 may discard the sensor data or evidentiary electronic processor 106 may upload the sensor data according to a predefined policy. For example, evidentiary electronic processor 106 may upload the sensor data without including the talkgroup identifier and/or the incident identifier with the uploaded sensor data. In another example, when the assignment status of the sending communication device is unassigned to the incident and associated with the second profile, evidentiary electronic processor 106 may upload the sensor data and a value below a predefined threshold.

Evidentiary electronic processor 106 may also use the evidentiary reliability index to execute one or more predefined policies. For example, if the evidentiary reliability index is above the first threshold, subsequent to uploading the sensor data to evidentiary repository 108, evidentiary electronic processor 106 may disseminate the sensor data to communication devices in the incident area. In another example, if the evidentiary reliability index is below the first threshold, subsequent to uploading the sensor data, evidentiary electronic processor 106 may transmit the sensor data via direct mode to communication devices within a predefined vicinity of the sending communication device.

Subsequent to updating evidentiary repository 108 with sensor data from authorized devices, i.e., communication devices transmitting a valid access token with the sensor data and associated with incident group 332 or with modified incident group 334, evidentiary electronic processor 106 may execute one or more policies associated with uploading relevant incident data. For example, evidentiary electronic processor 106 may disseminate the sensor data to members of talkgroups A, B, and/or C and/or notify members of talkgroups A, B, and/or C.

When the sensor data is uploaded into evidentiary repository 108, the meta-data associated with the sensor data may be used to search evidentiary repository 108 for the sensor data. For example, during post incident analysis, the talkgroup identifier and/or the incident identifier may be transmitted in a query request in order for a forensic analyst to search the meta-data associated with the sensor data and retrieve relevant and/or evidentiary information associated with the incident from evidentiary repository 108.

Figure 3A:
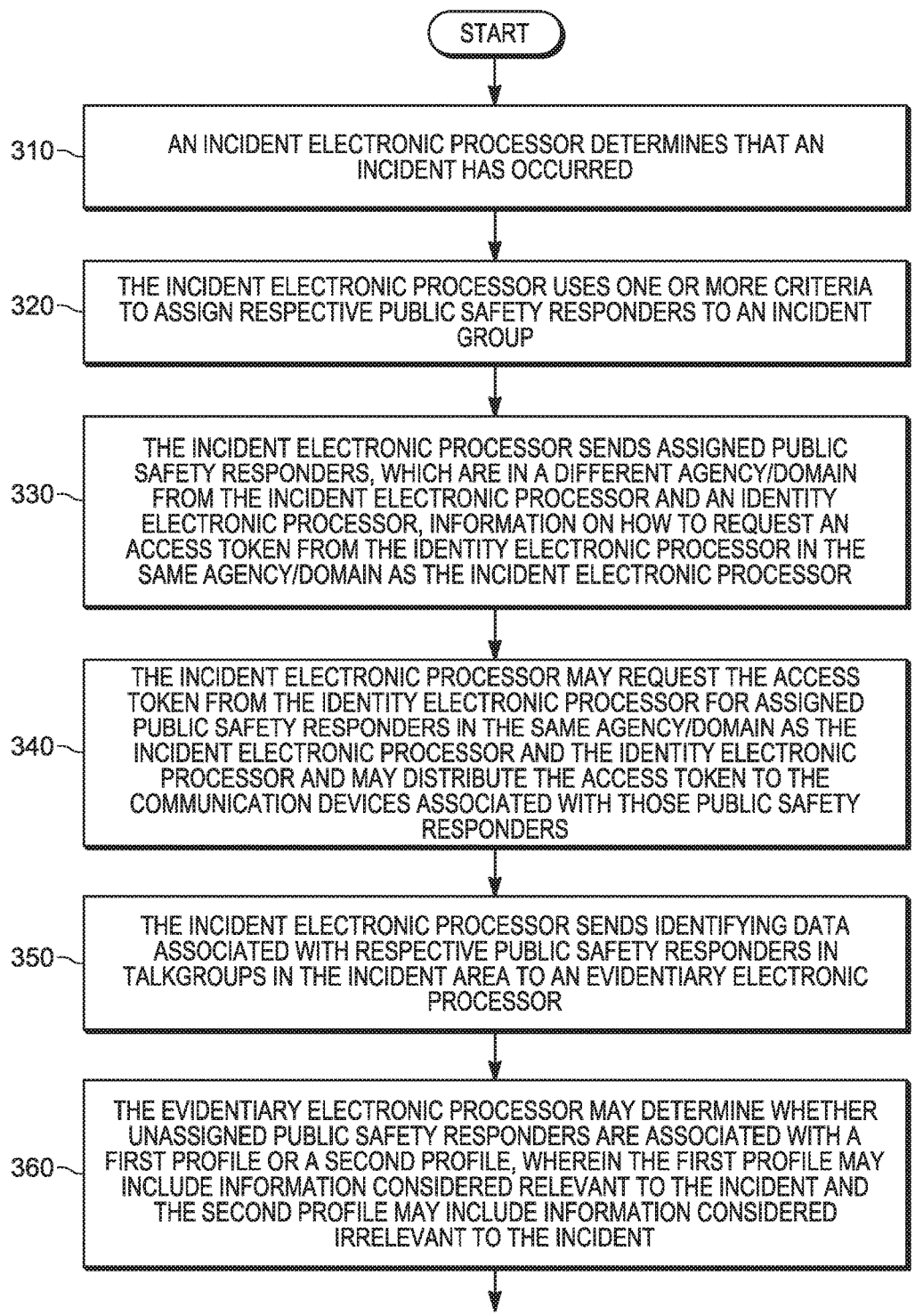
FIGS. 3A-3B are flowcharts of a method of creating assignment status for an incident in accordance with some embodiments.
Figure 3B:
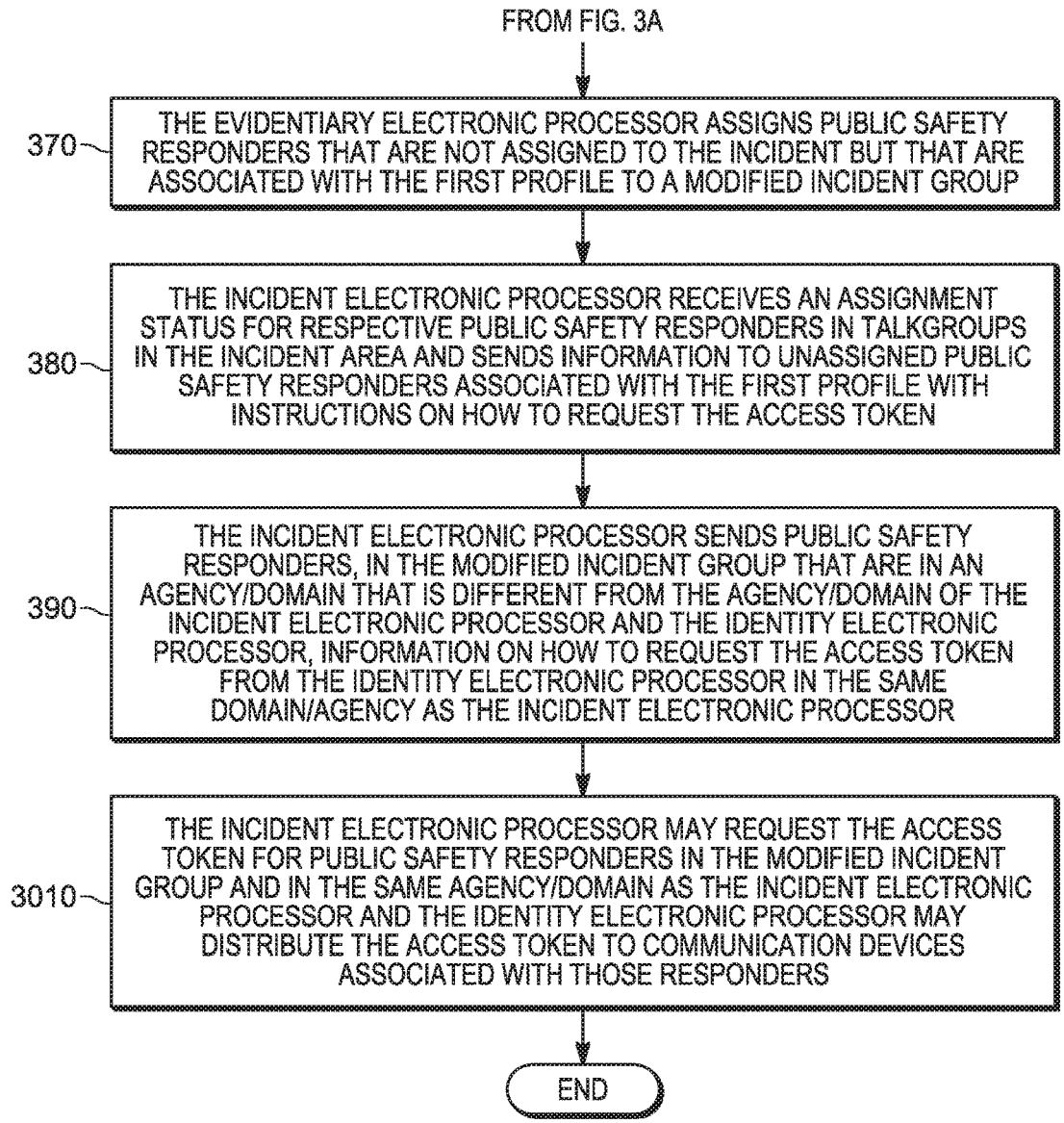

FIGS. 3A-3B are flowcharts of a method of creating assignment status for an incident in accordance with some embodiments. At 310, an incident electronic processor, for example incident electronic processor 102, determines that an incident has occurred. For example, the incident electronic processor may receive a report of the incident from communication devices in an incident area. At 320, the incident electronic processor uses one or more criteria to assign respective public safety responders to an incident group. At 330, the incident electronic processor sends assigned public safety responders, which are in a different agency/domain from the incident electronic processor and an identity electronic processor, for example identity electronic processor 104, information on how to request an access token from the identity electronic processor in the same agency/domain as the incident electronic processor.

At 340, the incident electronic processor may request the access token from the identity electronic processor for assigned public safety responders in the same agency/domain as the incident electronic processor and the identity electronic processor and may distribute the access token to the communication devices associated with those public safety responders. Communication devices associated with assigned public safety responders that are in a different agency/domain from the incident electronic processor may request the access token from the incident electronic processor themselves rather than have the incident electronic processor request the access token from the identity electronic processor, as performed in 340.

At 350, the incident electronic processor sends identifying data associated with respective public safety responders in talkgroups in the incident area to an evidentiary electronic processor, for example evidentiary electronic processor 106. At 360, the evidentiary electronic processor may determine whether unassigned public safety responders are associated with a first profile or a second profile, wherein the first profile may include information considered relevant to the incident and the second profile may include information considered irrelevant to the incident.

At 370, the evidentiary electronic processor assigns public safety responders that are not assigned to the incident but that are associated with the first profile to a modified incident group. At 380, the incident electronic processor receives an assignment status for respective public safety responders in talkgroups in the incident area and sends information to unassigned public safety responders associated with the first profile with instructions on how to request the access token. The information sent from the incident electronic processor may depend on whether the public safety responder is in the same agency/domain as the identity electronic processor. For example, when the unassigned public safety responders associated with the first profile is in an agency/domain that is different from the agency/domain of the incident electronic processor, the information may include instructions on how to request the access token from the identity electronic processor in the same agency/domain as the incident electronic processor.

At 390, the incident electronic processor sends public safety responders, in the modified incident group that are in an agency/domain that is different from the agency/domain of the incident electronic processor and the identity electronic processor, information on how to request the access token from the identity electronic processor in the same domain/agency as the incident electronic processor. At 3010, the incident electronic processor may request the access token for public safety responders in the modified incident group and in the same agency/domain as the incident electronic processor and the identity electronic processor may distribute the access token to communication devices associated with those public safety responders, wherein public safety responders associated with the modified incident group that are in a different domain from the incident electronic processor may request the second access token from the incident electronic processor themselves.

Figure 4:
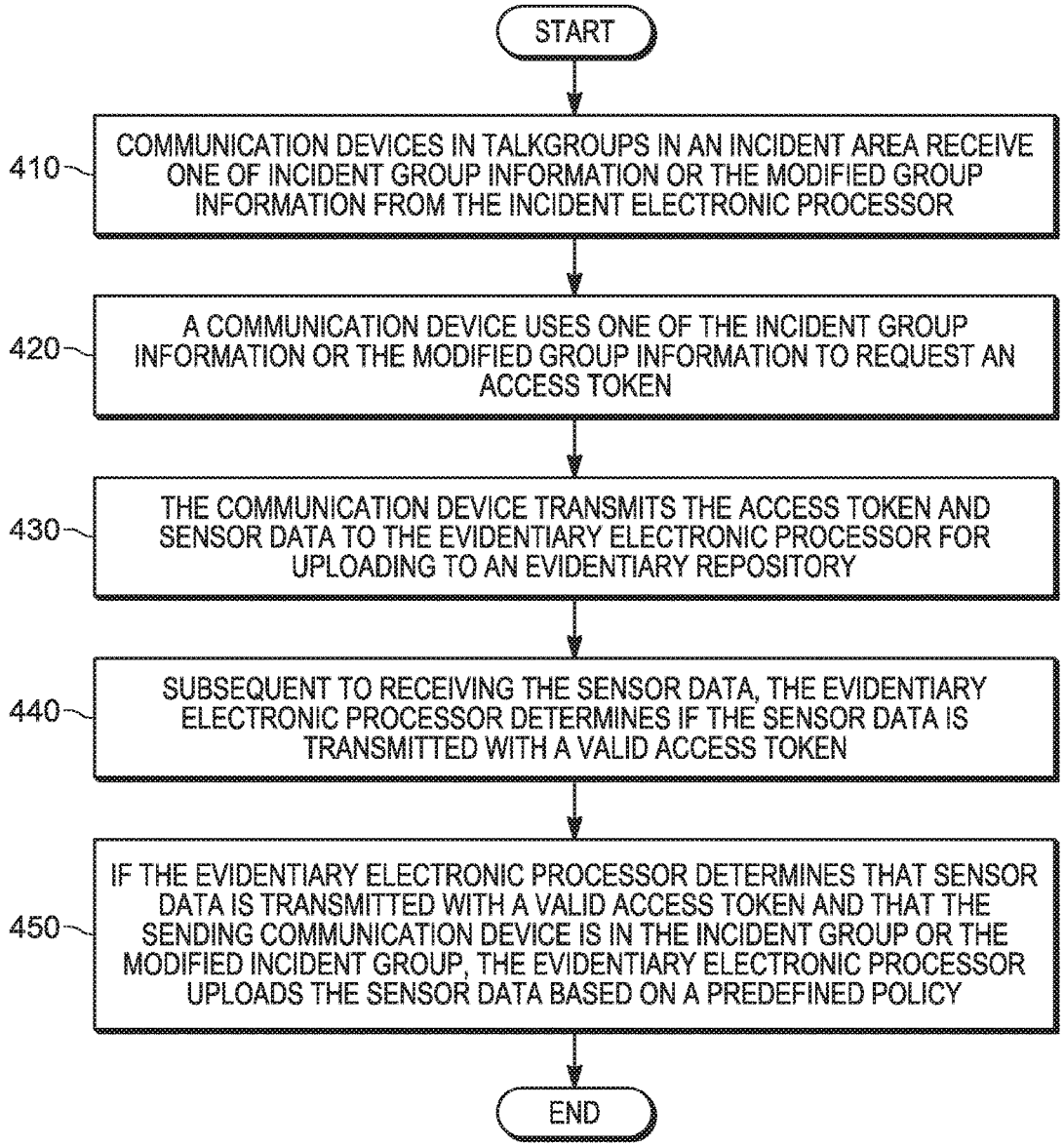
FIG. 4 is a flowchart of a method of collecting relevant data for an incident in accordance with some embodiments.

FIG. 4 is a flowchart of a method of collecting relevant data for an incident in accordance with some embodiments. At 410, communication devices in talkgroups in an incident area receive one of incident group information or the modified group information from an incident electronic processor, for example incident electronic processor 102. At 420, a communication device uses one of the incident group information or the modified group information to request an access token from an identity electronic processor, for example identity electronic processor 104 (the received information may include the actual address of the identity electronic processor and other information needed to request an access token).

At 430, the communication device transmits the access token and sensor data to an evidentiary electronic processor, for example evidentiary electronic processor 106 for uploading to an evidentiary repository, for example, evidentiary repository 108. At 440, subsequent to receiving the sensor data, the evidentiary electronic processor determines if the sensor data is transmitted with a valid access token. At 450, if the evidentiary electronic processor determines that sensor data is transmitted with a valid access token and that the sending communication device is in the incident group or the modified incident group, the evidentiary electronic processor uploads the sensor data based on a predefined policy. For example, the evidentiary electronic processor may disseminate the sensor data to communication devices in the incident area.

Figure 5:
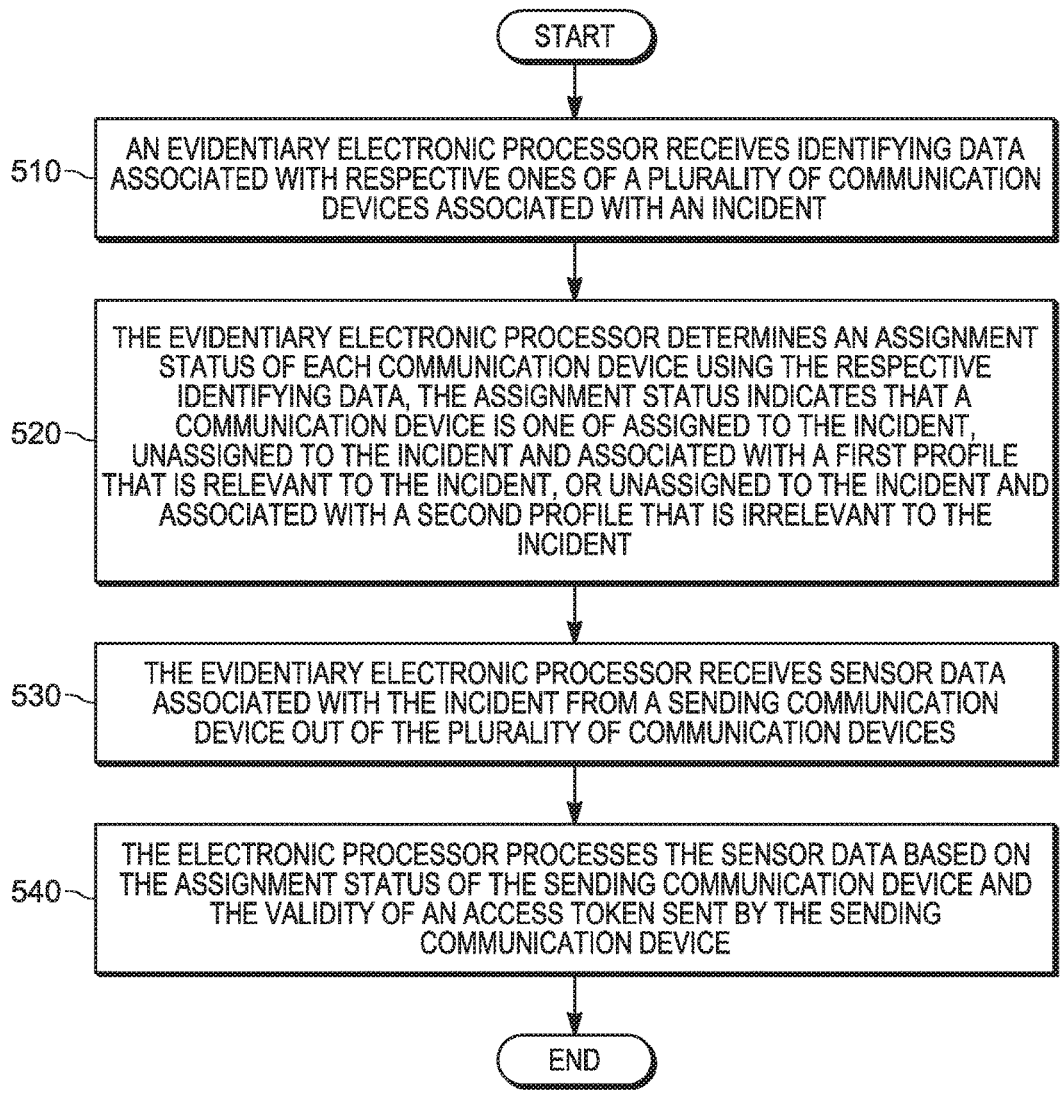
FIG. 5 is a flow diagram of a method of uploading relevant data for an incident in accordance with some embodiments.

FIG. 5 is a flow diagram of a method of uploading relevant data for an incident in accordance with some embodiments. At 510, an evidentiary electronic processor, for example evidentiary electronic processor 106, receives identifying data associated with respective ones of a plurality of communication devices associated with an incident. At 520, the evidentiary electronic processor determines an assignment status of each communication device using the respective identifying data. The assignment status indicates that a communication device is one of assigned to the incident, unassigned to the incident and associated with a first profile that is relevant to the incident, or unassigned to the incident and associated with a second profile that is irrelevant to the incident. At 530, the evidentiary electronic processor receives sensor data associated with the incident from a sending communication device out of the plurality of communication devices. At 540, the evidentiary electronic processor processes the sensor data based on the assignment status of the sending communication device and the validity of an access token sent by the sending communication device. For example, the evidentiary electronic processor uploads the sensor data to an evidentiary database based on the assignment status of the sending communication device and the validity of an access token sent by the sending communication device.

Figure 6:
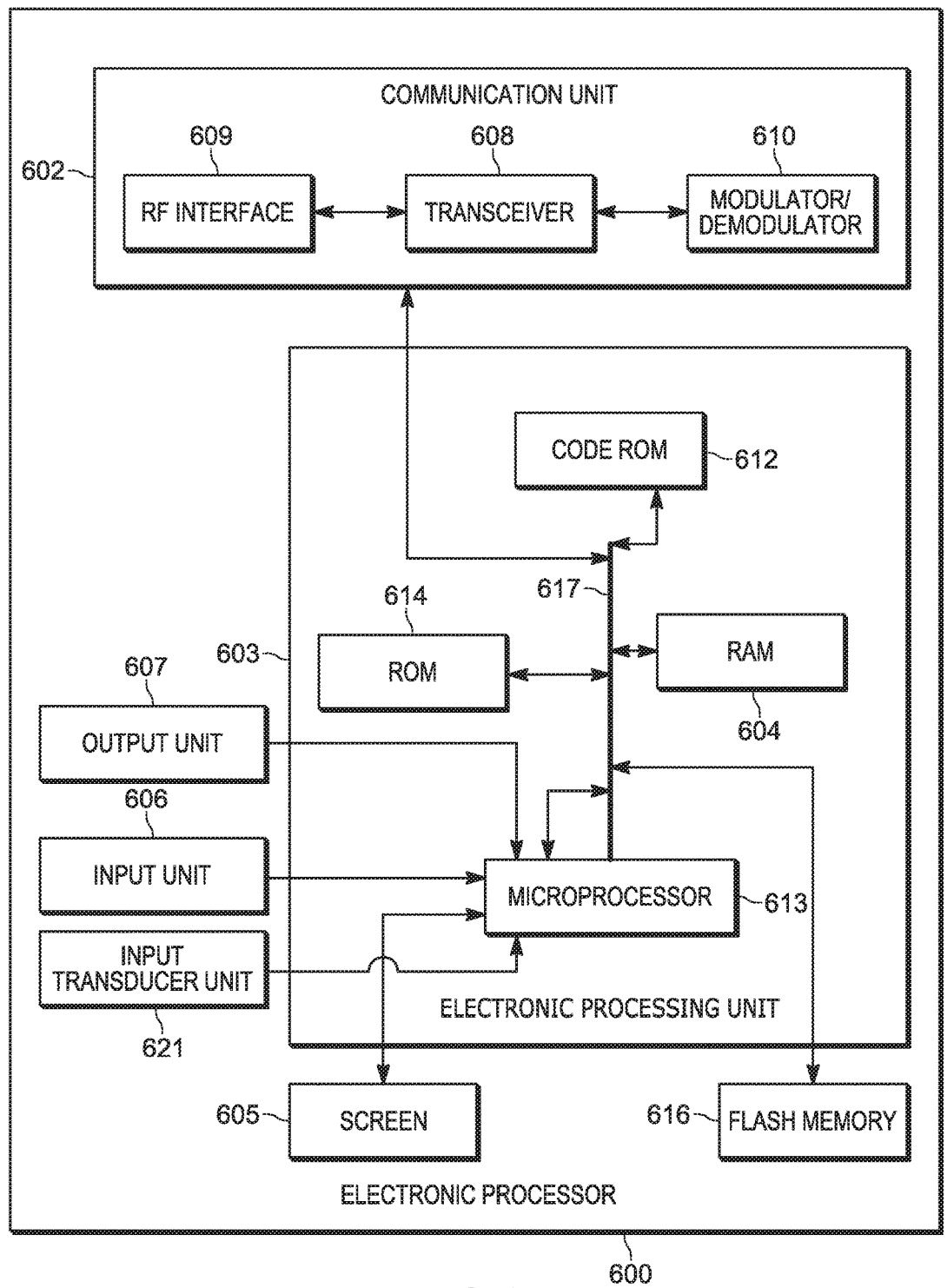
FIG. 6 is a block diagram of an electronic processor used in accordance with some embodiments.

FIG. 6 is a block diagram of the electronic processor 600, such as incident electronic processor 102, identity electronic processor 104 or evidentiary electronic processor 106, used in accordance with some embodiments, and/or may be a distributed electronic processor across two or more of the foregoing (or multiple of a same type of one of the foregoing) and linked via a wired and/or wireless communication link(s). Electronic processor 600, for example, may include a communications unit 602 coupled to a common data and address bus 617 of an electronic processor/electronic processing unit 603. Electronic processor 600 may also include an input unit (e.g., keypad, pointing device, etc.) 606, an output transducer unit (e.g., speaker) 607, an input transducer unit (e.g., a microphone) (MIC) 621, and a display screen 605, each coupled to be in communication with the electronic processing unit 603.

The electronic processing unit 603 may include a code read-only memory (ROM) 612 for storing data for initializing system components of electronic processor 600. The electronic processing unit 603 may further include a microprocessor 613 coupled, by the common data and address bus 617, to one or more memory devices, such as a read only memory (ROM) 614, a random-access memory (RAM) 604, and/or a static memory or flash memory 616. One or more of ROM 614, RAM 604 and flash memory 616 may be included as part of electronic processing unit 603 or may be separate from, and coupled to, the electronic processing unit 603.

Communications unit 602 may include an RF interface 609 configurable to communicate with network components and other user equipment within its communication range. Communications unit 602 may include one or more broadband and/or narrowband transceivers 608, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 602 may also include one or more local area network or personal area network transceivers perhaps operating in accordance with an IEEE 802.11 standard (e.g., 802.11a, 802.11b, 802.11g), or a Bluetooth transceiver. The transceivers may be coupled to a combined modulator/demodulator 610. The one or more memory devices 612, 614 and 616 are configured to store non-transitory computer-executable instructions to perform a set of functions such as one or more of the steps set forth in FIGS. 3-5.

Figure 7:
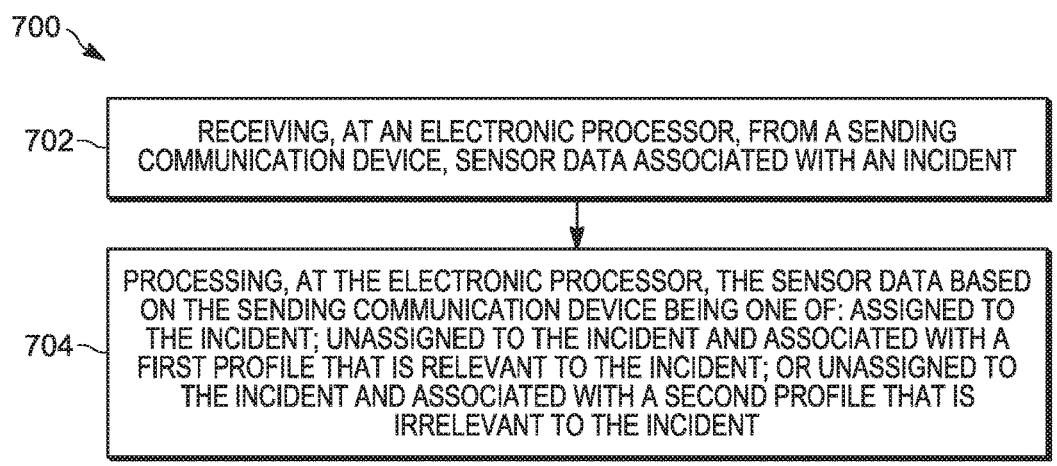
FIG. 7 is a flow diagram of a method for processing sensor data in accordance with some embodiments.

Attention is now directed to FIG. 7 which depicts a flowchart representative of a method 700 for processing sensor data. The operations of the method 700 of FIG. 7 correspond to machine readable instructions that are executed by, for example, the electronic processor 600, and specifically by the microprocessor 613 of the electronic processor 600. In the illustrated example, the instructions represented by the blocks of FIG. 7 are stored at a memory of the electronic processor 600. The method 700 of FIG. 7 is one way in which the microprocessor 613 and/or the electronic processor 600 and/or the system 100 is configured. Furthermore, the following discussion of the method 700 of FIG. 7 will lead to a further understanding of the system 100, and its various components. However, it is to be understood that the method 700 and/or the system 100 may be varied, and need not work exactly as discussed herein in conjunction with each other, and that such variations are within the scope of present embodiments.

The method 700 of FIG. 7 need not be performed in the exact sequence as shown and likewise various blocks may be performed in parallel rather than in sequence. Accordingly, the elements of method 700 are referred to herein as "blocks" rather than "steps." The method 700 of FIG. 7 may be implemented on variations of the system 100 of FIG. 1, as well.

In particular, the method 700 comprises an embodiment of the steps set forth in FIGS. 3-5 and may be specifically implemented at a microprocessor 613 of the incident electronic processor 102 (e.g. in these embodiments, the electronic processor 600 comprises the incident electronic processor 102).

At a block 702, the electronic processor 600 receives, from a sending communication device (e.g. one of the devices 202-230), sensor data associated with an incident.

At a block 704, the electronic processor 600 processes the sensor data based on the sending communication device being one of: assigned to the incident; unassigned to the incident and associated with a first profile that is relevant to the incident; or unassigned to the incident and associated with a second profile that is irrelevant to the incident. Such assignments and associations and profiles are described in more detail above.

In particular, the assignment of the block 704 (e.g. sending communication device being assigned or unassigned to an incident) may be based on incident affiliation. Data that may be used to determine such incident affiliation may include, but is not limited to, one or more of: an agency and/or organization affiliation associated with the sending communication device (e.g. an agency and/or an organization assigned to an incident, and which may include an agency and/or an organization that is not directly responsible for the incident, such as a fire service agency assigned to assist with a police incident and/or agencies that provide mutual aid to each other); a jurisdiction of an agency and/or an organization associated with the sending communication (e.g. the incident having occurred within the agency's jurisdiction); a proximity to the incident of a responder associated with the sending communication; and the like.

Figure 8:
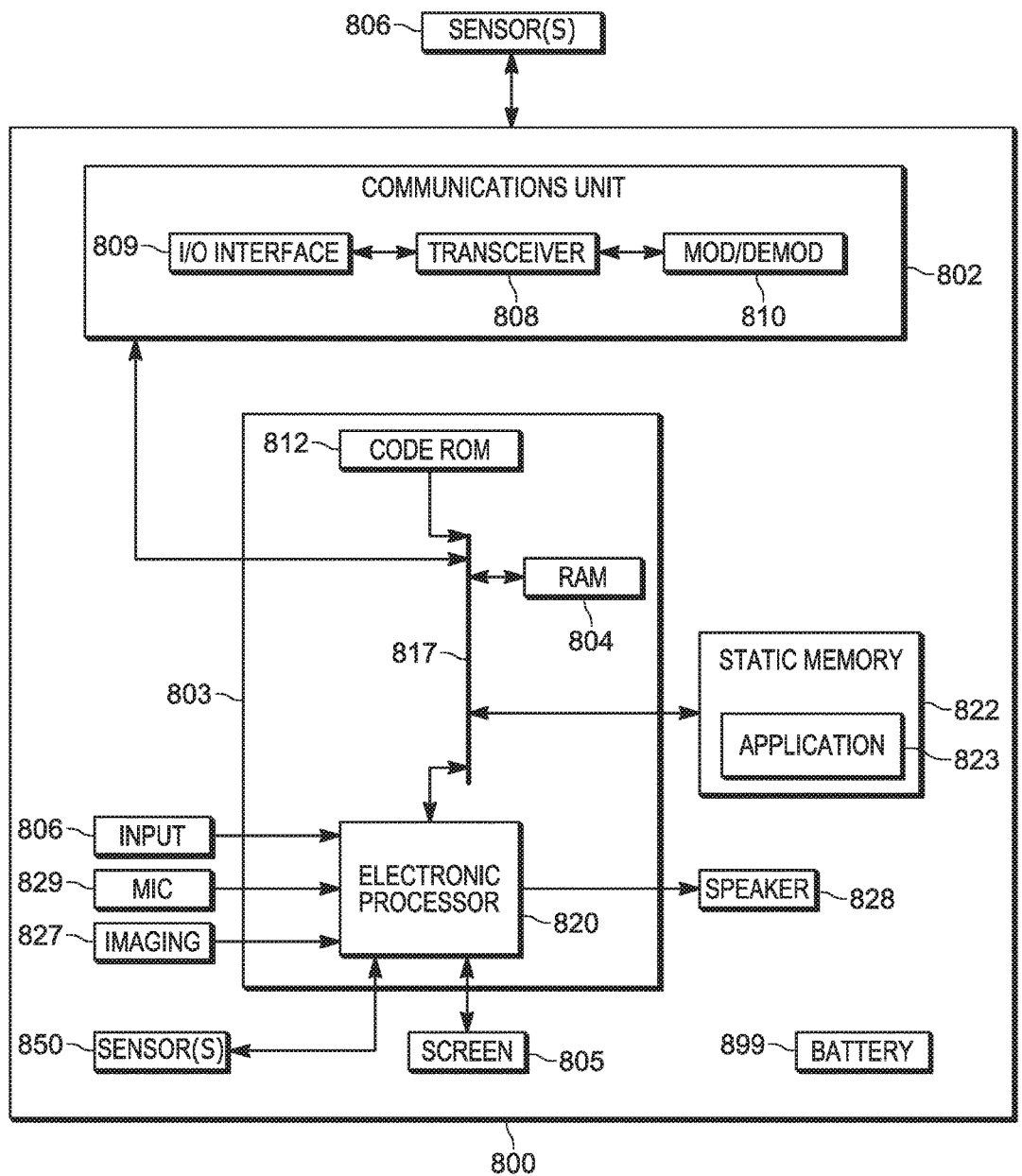
FIG. 8 is a block diagram of a receiving device configured to share sensor data in accordance with some embodiments.

Attention is next directed to FIG. 8 that represents a block diagram of a communication device 800 such as one or more of the devices 202-230. Put another way, the configuration of one or more of the devices 202-230 may be similar to the communication device 800. The communication device 800 may be, for example, embodied in one or more of the devices 202-230, or some other communication device not illustrated in FIG. 2, and/or may be a distributed computing and/or communication device across two or more of the foregoing (or multiple of a same type of one of the foregoing) and linked via a wired and/or wireless communication link(s).

As depicted, the communication device 800 generally includes a communications unit 802, a processing unit 803, a Random Access Memory (RAM) 804, a display screen 805, an input device 806, one or more wireless transceivers 808, one or more wired and/or wireless input/output (I/O) interfaces 809, a combined modulator/demodulator 810, a code Read Only Memory (ROM) 812, a common data and address bus 817, a electronic processor 820, a static memory 822 storing a application 823, an imaging device 827, a speaker 828, and a microphone 829.

As depicted, the communication device 800 further includes one or more sensors 850 and/or may be communicatively coupled to other sensors 860, for example via the communications unit 802, and in particular sensors in a personal area network and/or a vehicle area network. In general, the communication device 800 receives sensor data from the one or more sensors 850, 860 and may share the sensor data with a requestor device, for example one or more of the devices 202-230 and/or the incident electronic processor 102 (and/or the evidentiary electronic processor 106). Hence, the communication device 800 is alternatively and interchangeably referred to hereafter as the receiving device 800, and a device requesting the sensor data is referred to hereafter as a requestor device.

However, while the receiving device 800 is described with respect to including certain components, it is understood that the receiving device 800 may be configured according to the functionality of a specific device.

Hence, while the receiving device 800 represents the devices 202-230 described above with respect to FIG. 2, depending on a type of the receiving device 800, the receiving device 800 may include fewer or additional components in configurations different from that illustrated in FIG. 8. For example, in some embodiments, the receiving device 800 acting as a communication unit of a personal area network (PAN) and/or a vehicle area network (VAN) may not include one or more of the display screen 805, input device 806, microphone 829, imaging device 827, speaker 828, and sensors 850. As another example, in some embodiments, the receiving device 800 may further include a location determination device (for example, a global positioning system (GPS) receiver) as explained above. Other combinations are possible as well.

The receiving device 800 may be powered by a battery 899; while the battery 899 is depicted as not connected to other components of the receiving device 800, it is assumed that the battery 899 powers all components of the receiving device 800 that require power to operate. However, components of the receiving device 800 may alternatively be powered by other power supplies, including connections to external batteries and/or power supplies and the like, and/or batteries dedicated to certain components.

Sensors 850, 860 may include, but are not limited to, one or more of: the imaging device 827, the microphone 829, a camera, a body worn camera, a video device, smart glasses, a camera-status sensor, a biometric sensor, a biometric sensor wristband, a health sensor, a biomonitoring sensor, an environmental sensor, a user-status sensor, a holster sensor (e.g. configured to determine whether a weapon is drawn), a "man-down" sensor (e.g. such as a sensor-equipped vest, and the like and/or an accelerometer, a gyroscope, and the like), a location sensor (including, but not limited to, a global positioning system (GPS) receiver), a vehicle sensor and the like. Hence, sensor data as described herein may include, but is not limited to, sensor metadata such as a GPS location and/or time stamp of an image, a video, and the like.

Furthermore, such sensors 850, 860 may include one or more vehicle sensors, which may include cameras, microphones etc. at a vehicle, and/or sensors which detect impact at a vehicle and/or location of a vehicle and/or acceleration of a vehicle, and the like.

Furthermore, the receiving device 800 generally receives sensor data from the sensors 850, 860 in a discrete and/or continuous manner. For example, photos, video frames, GPS locations, and the like may be received periodically, and/or upon receipt of input data at the input device 806. Alternatively, and/or in addition to, photos, video frames, GPS locations, and the like, may be acquired in a relatively continuous "stream" of data (e.g. a video stream and/or GPS breadcrumbs, and the like). Furthermore, the device 800 may be generally configured to upload and/or transmit the sensor data to the evidentiary repository 108 periodically, continuously, and/or upon exceeding a threshold amount of sensor data and/or upon detection of an event indicated in the sensor data, and the like. Such events may include, but are not limited to, one or more of: a weapon drawn/fired (e.g. as detected by a holster sensor), a vest pierced (e.g. detected by a vest sensor), a man down (e.g. detected by a vest sensor and/or a man-down sensor and/or a biometric sensor and/or an accelerometer and/or a gyroscope), vehicle impacted (e.g. detected by a vehicle sensor), an event in a video stream (e.g. detected by machine learning algorithm and the like), an event in a video clip (e.g. detected by machine learning algorithm and the like), biometric heart rate (e.g. detected by a biometric sensor, and the like), and the like.

Furthermore, transmission of the sensor data to the evidentiary repository 108 generally includes "signing" of the sensor data by the receiving device 800 by way of access tokens as described above.

Furthermore, as in some embodiments, the receiving device 800 may implement one or more machine learning algorithms (e.g. as store in the application 823, and the like) to detect events in the sensor data, for example to detect a "man-down" in a video stream from a video camera, and the like, using video analytics, and/or to audio indicating a "man-down" in an audio stream from the microphone 829, and the like, using audio analytics.

The receiving device 800 is described hereafter in further detail. As shown in FIG. 2, the receiving device 800 includes the communications unit 802 coupled to the common data and address bus 817 of the processing unit 803. The receiving device 800 may also include the one or more input devices 806 (e.g., keypad, pointing device, touch-sensitive surface, etc.) and the display screen 805 (which, in some embodiments, may be a touch screen and thus also act as an input device 806), each coupled to be in communication with the processing unit 803.

The imaging device 827 may provide video (still or moving images) of an area in a field of view of the receiving device 800 for further processing by the processing unit 803 and/or for further transmission by the communications unit 802.

The speaker 828 may be present for reproducing audio that is decoded from voice or audio streams of calls received via the communications unit 802 from other portable radios, from digital audio stored at the receiving device 800, from other ad-hoc or direct mode devices, and/or from an infrastructure radio access network device (e.g. a wireless cellphone tower and/or antenna, and the like), or may playback alert tones or other types of pre-recorded audio.

The microphone 829 may be present for capturing audio from a user and/or other environmental or background audio that is further processed by the processing unit 803 in accordance with the remainder of this disclosure and/or is transmitted as voice or audio stream data, or as acoustical environment indications, by the communications unit 802 to other portable radios and/or other communication devices.

The processing unit 803 may include the code Read Only Memory (ROM) 812 coupled to the common data and address bus 817 for storing data for initializing system components. The processing unit 803 may further include the electronic processor 820 coupled, by the common data and address bus 817, to the Random-Access Memory (RAM) 804 and a static memory 822.

The communications unit 802 may include one or more wired and/or wireless input/output (I/O) interfaces 809 that are configurable to communicate with other communication devices, such as a portable radio, a laptop, a wireless radio access network, and/or a mobile communication device.

For example, the communications unit 802 may include one or more wireless transceivers 808 used for infrastructure radio access network (RAN) or direct-mode media (e.g., voice, audio, video, etc.) that has a transmitter transmit range on the order of miles, e.g., 0.5-50 miles, or 3-20 miles (i.e., long-range in comparison to a short-range transmitter such as a Bluetooth™, Zigbee™, or NFC (near field communication) transmitter) with other communication devices and/or an infrastructure RAN (e.g. a wireless communications tower, a cellphone tower, and the like). One or more wireless transceivers 808 may include a long-range transmitter which may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

The communications unit 802 may additionally or alternatively include one or more wireline transceivers 808, such as an Ethernet transceiver, a USB transceiver, or similar transceiver configurable to communicate via a twisted pair wire, a coaxial cable, a fiber-optic link, or a similar physical connection to a wireline network. The transceiver 808 is also coupled to a combined modulator/demodulator 810.

The electronic processor 820 may include hardware ports for coupling to the display screen 805, the input device 806, the imaging device 827, the speaker 828 and/or the microphone 829.

The electronic processor 820 includes one or more logic circuits, one or more processors, one or more microprocessors, one or more ASIC (application-specific integrated circuits) and one or more FPGA (field-programmable gate arrays), and/or another electronic device. In some embodiments, the electronic processor 820 and/or the receiving device 800 is not a generic controller and/or a generic device, but a device specifically configured to implement functionality for sharing sensor data. For example, in some embodiments, the receiving device 800 and/or the electronic processor 820 specifically comprises a computer executable engine configured to implement specific functionality for sharing sensor data.

The static memory 822 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the receiving device 800 as described herein are maintained, persistently, at the memory 822 and used by the electronic processor 820 which makes appropriate utilization of volatile storage during the execution of such programming instructions.

In particular, the static memory 822 stores instructions corresponding to the application 823 that, when executed by the electronic processor 820, enables the electronic processor 820 to implement functionality for sharing sensor data. In illustrated examples, when the electronic processor 820 executes the application 823, the electronic processor 820 is enabled to: receive, from a requestor device, a request to access sensor data acquired by sensors 850, 860 associated with a receiver device (e.g. the receiving device 800); determine a status of the receiver device; determine, from the status of the receiver device, a subset of the sensor data to share with the requestor device; determine one or more override contextual conditions associated with one or more of the requestor device and the receiver device; and when the one or more override contextual conditions meets one or more override threshold conditions, cause the subset of the sensor data to be shared with the requestor device.

Indeed, it is assumed, in some embodiments, that access to the sensor data is generally restricted such that the receiving device 800 may require some sort of override in order for a requestor device to access the sensor data. The override contextual conditions and the override threshold conditions are described in more detail below.

Hence, as used herein, the term "override" may include overriding such restrictions to the sensor data. However, as described below, the receiving device 800 may periodically upload the sensor data to the evidentiary repository 108, for example, in a formal "post incident upload", for example periodically, upon receipt of input data at the input device, and/or after receiving data indicating that an incident is complete (e.g. "post incident"). Hence, the term "override" may also include overriding a periodic upload process to the evidentiary repository 108, and the like, for example by sharing the subset of the sensor data (as described in more detail below) prior to a scheduled (or otherwise) instance of such a periodic (or otherwise) upload, whereas the subset of the sensor data may otherwise not be available at the evidentiary repository 108 and/or the requestor device may not have access to the subset of the sensor data stored at the evidentiary repository 108.

Furthermore, sharing of the subset of the sensor data as described herein may include sharing of sensor data that has already been uploaded to the evidentiary repository 108 as well as sharing of sensor data that has not been uploaded to the evidentiary repository 108.

Figure 9:
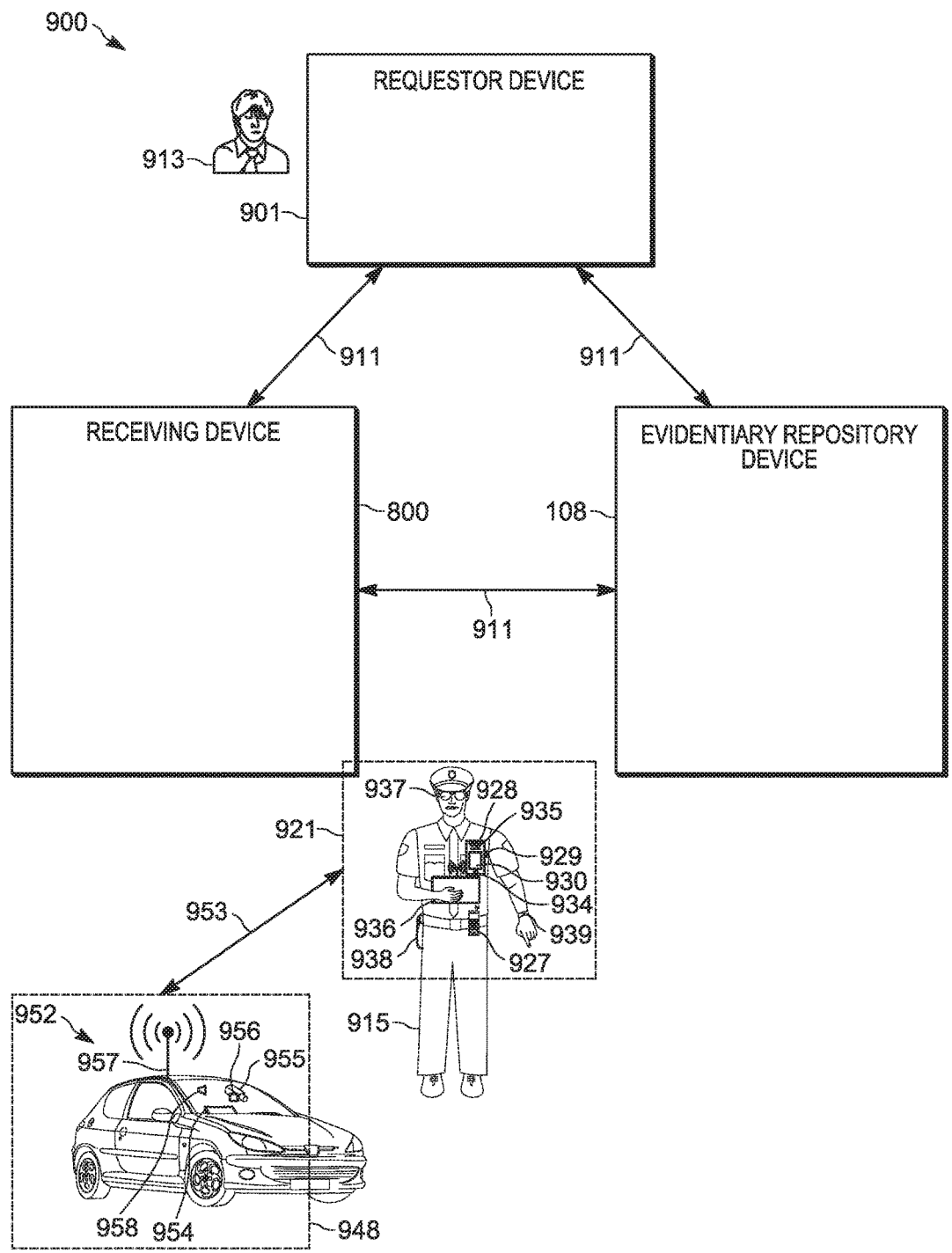
FIG. 9 is a block diagram of a system for sharing sensor data in accordance with some embodiments.

Attention is next directed to FIG. 9 which depicts a system 900 that include the receiving device 800 in communication with a requestor device 901 and the evidentiary repository 108 (alternatively referred to as the evidentiary repository device 108) via respective communication links 911; as depicted, the requestor device 901 is in communication with the evidentiary repository 108 via a respective communication link 911. The links 911 may be wireless and/or wired as desired and may include one or more wireless communication networks and/or wireless infrastructure radio access networks.

The requestor device 901 may have a configuration similar to the electronic processor 600 of FIG. 6, or a configuration similar to the receiving device 800 of FIG. 8. In other words, the requestor device 901 may comprise one or more of the devices 202-230 (e.g. different from a device 202-230 that is acting as the receiver device 800) and/or the incident electronic processor 102 and/or the evidentiary electronic processor 106 and/or any device that requests access to sensor data from the receiving device 800. Either way, the requestor device 901 is generally configured to request access to sensor data received by the receiving device 800.

Indeed, as depicted, the requestor device 901 is associated with and/or operated by a user 913 who may be a first responder, a dispatcher and the like.

Similarly, the receiving device 800 is associated with a responder 915, for example, as depicted, a police officer. As depicted, the responder 915 is operating and/or wearing and/or is associated with a plurality of devices which form a personal area network 921 including, but not limited to: a primary battery-powered portable radio 927, a battery-powered radio speaker microphone (RSM) video capture device 928 (which includes a push-to-talk (PTT) switch 929, a display screen 930 and a video camera 934 and a microphone 935 (which is assumed to be a component of a speaker/microphone assembly), a laptop 936 (which may include an integrated video camera and/or microphone and/or speaker and used for data applications such as incident support applications), smart glasses 937 (e.g. which may be virtual reality, augmented reality, or mixed reality glasses and which may include an integrated video camera and/or microphone and/or speaker), a sensor-enabled holster 938, and/or a biometric sensor wristband 939. While not depicted, the personal area network 921 may include other types of devices that include sensors, such as a sensor equipped vest worn by the responder 915 which may be configured to detect when the vest is impacted and/or pierced.

The receiving device 800 may comprise one or more of the devices of the personal area network 921, such as the portable radio 927 which may act as the communication hub for the personal area network 921.

As depicted, the personal area network 921 is in communication with a vehicle area network 948 of a vehicle 952 via a communication link 953, which may be wireless and/or wired as desired. The vehicle 952 is equipped with a plurality of devices which form the vehicle area network 948 including, but not limited to: a mobile communication device 954, a respective vehicular video camera 955 and/or microphone 956, and coupled vehicular transceiver 957, as well as a speaker 958.

In some embodiments the receiving device 800 may comprise one or more of the devices of the vehicle area network 948, such as the mobile communication device 954, which may act as the communication hub for the vehicle area network 948. However, in the example embodiment described herein the receiving device 800 will be described with respect to the receiving device 800 comprising the portable radio 927 which receives sensor data from all the sensors of the personal area network 921 and the vehicle area network 948. In other words, the sensors 850, 860 described above may include any of the sensors of the personal area network 921 and the vehicle area network 948.

Furthermore, the requestor device 901 may have a configuration similar comprise one or more of the devices of the personal area network 921 and/or the vehicle area network 952, such as the portable radio 927 and/or s the mobile communication device. Similarly, the requestor device 901 may have the format of a smartphone, and the like.

Furthermore, the requestor device 901 may request access to the sensor data, for example when the responder 915 is disabled due to a man-down incident and the like, and/or in urgent situations, and/or in non-urgent situations, etc. However, the requestor device 901 may alternatively request access to the sensor data in other situations, for example when a "command center" application (e.g. at the requestor device 901, when the requestor device 901 comprises the incident electronic processor 102, and/or at one or more of the devices 202-230 and/or at a device in a talkgroup associated with an incident) requests the sensor data for incident management purposes prior to, and/or concurrently with, a formal "post incident upload" to the evidentiary repository 108. Such command center applications may include, but are not limited to, one or more of: computer aided dispatch applications, situational awareness applications, real-time crime center applications, analytics applications, video applications, and the like.

For example, the receiving device 800 may not be receiving and/or collecting and/or signing sensor data from all sensors all the time; indeed, even when the receiving device 800 is relatively continuously receiving and/or collecting sensor data, the sensor data may not be signed and transmitted to the evidentiary repository 108 relatively continuously, but may be signed and transmitted to the evidentiary repository 108 when a threshold amount of sensor data is received and/or collected and/or when a threshold event occurs. For example, a biometric sensor, such as the biometric sensor wristband 939, may be always running to collect heart rate data, and the like, but the heart rate data may not always be signed and transmitted to the evidentiary repository 108. Similarly, video collected by video cameras and/or video sensors may be signed, but not transmitted to the evidentiary repository 108 until a WiFi connection occurs (e.g. the save cellphone and/or LTE bandwidth) and/or an end of shift occurs (e.g. and/or another threshold event occurs). However, the requestor device 901 may request access to the sensor data prior to, and/or concurrently with, such uploading and/or after such uploading (e.g. but which may be before a formal "post-incident upload" before which the requestor device 901 may not have formal access and/or formal authorization to access the sensor data at either the receiving device 800 and/or the evidentiary repository 108).

Put another way, sharing restrictions may be placed on the sensor data, and access to the sensor data, for example by the devices 202-230 and/or the evidentiary repository 108, may occur by way of overriding such sharing restrictions in order to share the sensor data. Such sharing restrictions may be placed on the sensor data by the receiving device 800 and/or the evidentiary repository 108, for example, prior to uploading and/or signing the sensor data and/or prior to a formal "post-incident upload" (which can include uploading the sensor data to the evidentiary repository 108 prior to providing formal access to the sensor data).

Figure 10:
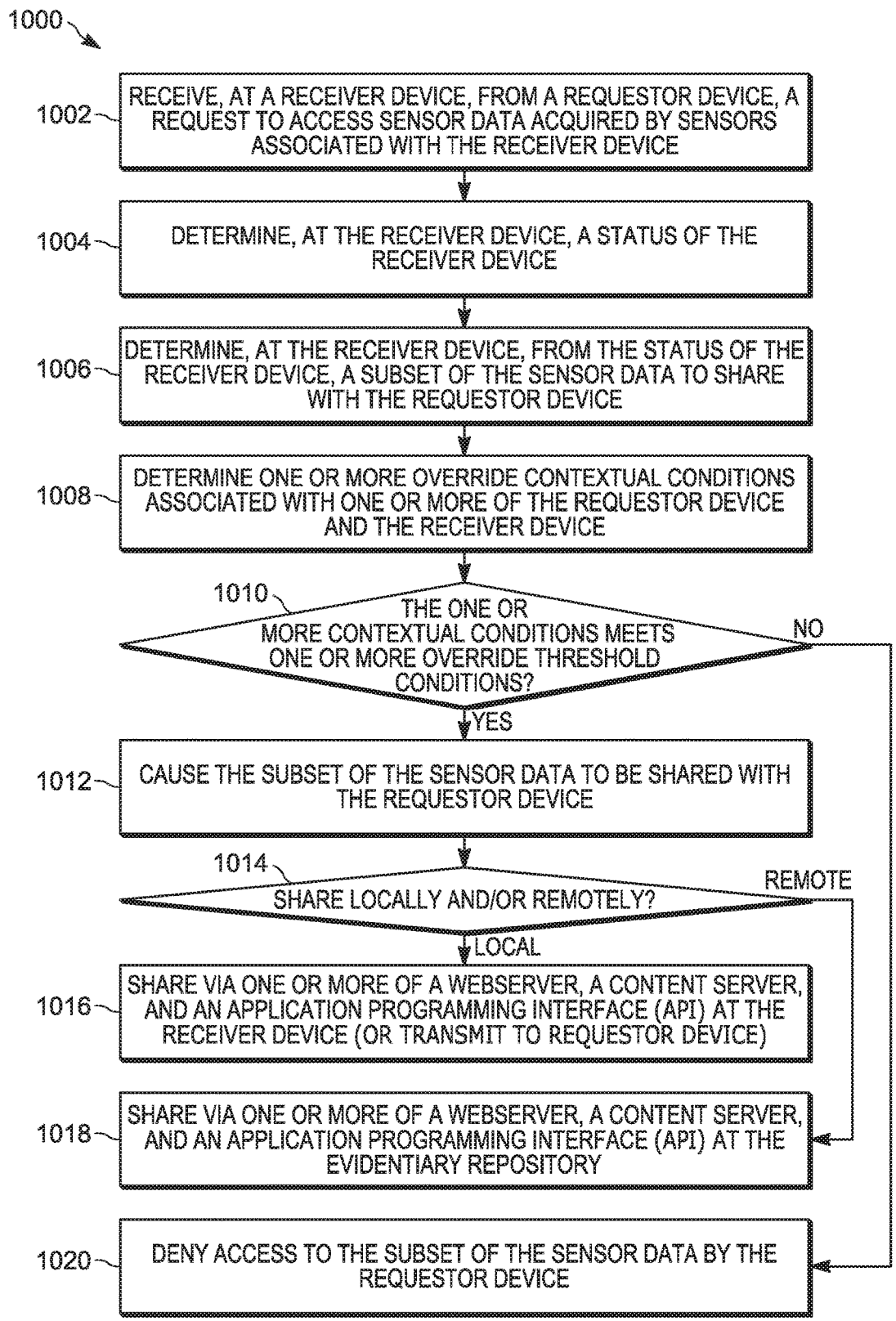
FIG. 10 is a flow diagram of a method for sharing sensor data in accordance with some embodiments.

Hence, attention is now directed to FIG. 10 which depicts a flowchart representative of a method 1000 for sharing sensor data. The operations of the method 1000 of FIG. 10 correspond to machine readable instructions that are executed by, for example, the receiving device 800, and specifically by the electronic processor 820 of the receiving device 800. In the illustrated example, the instructions represented by the blocks of FIG. 10 are stored at the static memory 822 of the receiving device 800 for example, as the application 823. The method 1000 of FIG. 10 is one way in which the electronic processor 820 and/or the receiving device 800 and/or the system 900 is configured. Furthermore, the following discussion of the method 1000 of FIG. 10 will lead to a further understanding of the system 900, and its various components. However, it is to be understood that the method 1000 and/or the system 900 may be varied, and need not work exactly as discussed herein in conjunction with each other, and that such variations are within the scope of present embodiments.

The method 1000 of FIG. 10 need not be performed in the exact sequence as shown and likewise various blocks may be performed in parallel rather than in sequence. Accordingly, the elements of method 1000 are referred to herein as "blocks" rather than "steps." The method 1000 of FIG. 10 may be implemented on variations of the system 900 of FIG. 1, as well.

At a block 1002, the receiving device 800 receives, from the requestor device 901, a request to access sensor data acquired by the sensors 850, 860 associated with the receiver device 800.

At a block 1004, the receiving device 800 determines a status of the receiver device 800. Such a status of the receiver device 800 may include, but is not limited to, a status (e.g. a charge level) of the battery 899 of the receiver device; a wireless signal strength (e.g. received signal strength intensity (RSSI) of a wireless network) at the receiver device 800; a bandwidth of the receiver device 800; receiver device 800; a memory utilization of the receiver device 800; processing resource utilization of the receiver device 800; and the like. In other words, such a determination of status may include a determination of one or more of resource utilization, bandwidth utilization, wireless network connections, battery state, and the like of the receiving device 800, and/or any other indication that may affect the ability of the receiving device 800 to transmit sensor data to the requestor device 901 and/or the evidentiary repository 108.

At a block 1006, the receiving device 800 determines, from the status of the receiver device 800, a subset of the sensor data to share with the requestor device 901. For example, the status of the receiver device 800 determined at the block 1004 may indicate that the resources of the receiving device 800 are such that not all the sensor data may be transmitted to the requestor device 901 and/or the evidentiary repository 108, and hence a subset of the sensor data may be determined for sharing based on such resources. For example, when the battery 899 is at a given power level, the subset of the sensor data may include an amount of the sensor data that may be transmitted without draining the battery 899 and/or causing a power-off condition to occur at the receiving device 800. However, the subset of the sensor data may include all the sensor data and/or a full set of the sensor data.

When not all the sensor data may be transmitted, the subset of the sensor data may be identified based on a prioritization of the sensor data. For example, video data may be more highly prioritized than location data and/or GPS breadcrumbs. Similarly, video data in a given time period (e.g. with a given time period of a time of an incident) may be more highly prioritized than video data outside the given time period. However, any suitable prioritization scheme is within the scope of present embodiments.

Furthermore, in some embodiments, the block 1006 may further include the receiving device 800 determining the subset of the sensor data to share with the requestor device 901 based on a combination of the status of the receiver device 800 and one or more of: a respective status of the sensor data; and attribute data received from the requestor device 901.

For example, such a status of the sensor data may include, but is not limited to, an age of sensor data (e.g. as described above with respect to prioritizing video data based on a given time period), a location that sensor data was received (e.g. inside or outside a geofence associated with an incident), and the like.

The attribute data received from the requestor device 901 may include, but is not limited to, one or more of: an organization (e.g. an agency affiliation) associated with the user 913 of the requestor device 901; qualifications associated with the user 913 of the requestor device 901; a role associated with the user 913 of the requestor device 901; an incident assignment associated with the user 913 of the requestor device 901; an assignment of the sensor data; a location of the user 913 of the requestor device 901; and a time the request (of the block 1002) was received (e.g. at the receiving device 800).

The attribute data associated with the user 913 of the requestor device 901 may indicate sensor data that may be shared based, for example, on a classification of the sensor data; in particular, some sensor data may be classified as more sensitive than other sensor data and restrictions placed on such sensor data may result in excluding such sensor data from the subset to be shared. For example, sensor data from the sensor-enabled holster 118 may be exclude or included in the subset based on the organization and/or the qualifications and/or the role the user 913 of the requestor device 901; in particular, when the user 913 is not affiliated with a police organization and/or has a role and/or a qualification below a threshold level, access to the sensor data from the sensor-enabled holster 118 may be restricted and hence excluded from the subset of the sensor data. Such attribute data may be provided with the request received at the block 1002 in form of alpha-numeric data, and the like, and compared against threshold attribute data at the receiving device 800.

Similarly, an incident assignment and/or location associated with the user 913 of the requestor device 901 may be compared with a current incident assignment of the receiving device 800 and/or current location of the receiving device 800, and the subset of the sensor data may include sensor data associated with the current incident assignment and/or current location, assuming the incident assignment associated with the user 913 of the requestor device 901 matches the current incident assignment and/or the location of the user 913 matches the current location. An incident assignment associated with the requestor device 901 may be provided with the request received at the block 1002 in form of alpha-numeric data, and the like, and compared against incident assignment data at the receiving device 800

Similarly, the time the request (of the block 1002) was received may be used to filter the sensor data in a manner similar to that described above with respect to prioritizing video data based on a given time period.

At a block 1008, the receiving device 800 determines one or more override contextual conditions associated with one or more of the requestor device 901 and the receiver device 800.

For example, such override contextual conditions may include, but are not limited to, one or more of:

A detected condition where the responder 915 is prone and/or not standing and/or laying down (e.g. detected via an accelerometer and/or gyroscope and/or man-down sensor).

A detected condition where received incident data indicates a violent incident and/or an emergency incident.

A detected condition where authorization data is received.

In other words, such override contextual conditions are not limited to conditions where the responder 915 may be incapacitated; for example, receipt of authorization data may, alone, comprise an override contextual condition.

Such override contextual conditions may be determined from one or more of: biometric sensor data from a biometric sensor device associated with the receiver device 800; man-down sensor data from a man-down sensor device associated with the receiver device 800; incident data associated with one or more of the requestor device 901 and the receiver device 800; at least one set of authorization data received at the receiving device 800; and the like. Hence, each of the override contextual conditions comprises a condition that is detectable at the receiver device 800 via sensor data, and/or via authorization data received at the receiver device, and the like.

However, the override contextual conditions may be determined from other types of data received at the receiver device 800. Regardless, the override contextual conditions are detectable by the receiving device 800.

Such detection may include implementation of one or more machine learning algorithms to detect an override contextual condition; for example, when the man-down sensor device includes a video device, a man-down override condition may be detected in video data using video analytics. Indeed, the override contextual conditions indicated by biometric sensor data, man-down sensor data and/or incident data may indicate that the responder 915 may be incapacitated.

Furthermore, the incident data may comprise data received at the receiving device 800, for example from the requestor device 901, indicating that the receiving device 800 and/or the requestor device 901 is associated with and/or assigned to an incident in which the requestor device 901 may require access to the sensor data received at the receiving device 800. Such incidents may be assigned a code that is present in the incident data to indicate such an incident type. Such incidents may hence include, but are not limited to, man-down incidents (e.g. an incident where the responder 915 is incapacitated and/or injured, and the like); however, other incident types are within the scope of the present specification.

In yet further embodiments, the one or more override contextual conditions may include receiving at least one set of authorization data at the receiving device 800. For example, authorization data may include authorization data indicating the consent of the responder 915 to share the sensor data with the requestor device 901, such authorization data including, but not limited, a passcode, and the like received via the input device 806, and/or, more simply, input indicating that the sensor data is to be shared with the requestor device 901. For example, upon receipt of the request at the block 1002, the display screen 805 may be controlled to render a graphic user interface (GUI) indicating that the request has been received and selectable options for consenting to the request or not consenting to the request (e.g. virtual buttons indicating that "YES" the request is to be granted, or "NO" the request is not to be granted).

However, when the responder 915 is not able to provide consent, for example when the responder 915 has been incapacitated, the at least one set of authorization data received at the receiving device 800 may include receiving authorization data via the communications unit 802 from one or more of devices 202-230, and the incident electronic processor 102 that includes, for example, authorization passcodes, and the like, for overriding sharing restrictions on the sensor data. Alternatively, such authorization data may be received via the input device 806, for example from one or more responders attempting to assist the responder 915 (e.g. when incapacitated), interacting with the input device 806 to input authorization passcodes, and the like.

At a block 1010, the receiving device 800 determines whether the one or more override contextual conditions meets one or more override threshold conditions.

The override threshold conditions may depend on the override contextual conditions determined at the block 1008.

For example, the override contextual condition is a condition where the responder 915 may be prone and the like, (e.g. according to a accelerometer and/or gyroscope and/or the man-down sensor data), the corresponding override threshold condition may include determining that the biometric sensor data and/or the man-down sensor data indicates that the responder 915 is "down" and/or incapacitated, for example by determining that a sensor-equipped vest is pierced and/or that biometric sensor data indicates the responder 915 is incapacitated.

Similarly, a corresponding override threshold condition for the incident data may include determining that the incident type is a type where the responder 915 is "down" and/or incapacitated and/or the responder 915 may be in danger. However, such a corresponding override threshold condition may be combined with determining that a sensor-equipped vest is pierced and/or that biometric sensor data indicates the responder 915 is incapacitated Similarly, a corresponding override threshold condition for the one or more sets of authorization data may include determining that the one or more sets of authorization data indicate the responder 915 has consented to share the sensor data. In these embodiments, the responder 915 may not be incapacitated, and has explicitly provided consent to digitally sign the subset of the sensor data and make the subset of the sensor data available locally and/or remotely.

Similarly, another corresponding override threshold condition for the one or more sets of authorization data may include determining that a given number of sets of authorization data has been received (e.g. and validated) from the incident electronic processor 102, one or more of the devices 202-230 and/or the input device 806. For example, an integer number "N" of sets of such authorization data may be required to be received that the receiving device 800 before the sensor data is shared. The "N" sets of such authorization data may be from "N" of "M" (where "M" is an integer number") of pre-authorized users and/or agencies and/or devices. In other words, there may be a pool of pre-authorized users and/or agencies and/or devices from which authorization data may be received, and the override threshold condition includes receiving "N" sets of authorization data from this pool of "M" pre-authorized users and/or agencies and/or devices. In some embodiments, "N" may be equal to "M", while in other embodiments, "N" is less than "M". Furthermore, there may be additional override threshold conditions associated with such embodiments. For example, of the "M" pre-authorized users and/or agencies and/or devices, the "N" sets of authorization data may need to be received in a given order and/or from at least a one given user and/or agency and/or device; in the latter instance, for example, of the "N" set of authorization data, at least one set may need to be received from a person who has a rank higher than the responder 915 and/or who is associated with a same agency (e.g. a police service) as the responder 915.

Indeed, the requestor device 901 may be pre-authorized to access the sensor data, assuming a "YES" decision at the block 1010. In other words, the method 1000 may include the receiving device 801 determining, for example from the request, that the requestor device 901 has authorization to be making the request to access the sensor data, for example by receiving an access token, and the like, with the request.

When the one or more override contextual conditions meets one or more override threshold conditions (e.g. a "YES" decision at the block 1010), at a block 1012, the receiving device 800 causes the subset of the sensor data to be shared with the requestor device 901. Such causing the subset of the sensor data to be shared with the requestor device 901 is next described with reference to block 1014, block 1016 and block 1018; in other words, the block 1014, the block 1016 and the block 1018 are implemented to cause the subset of the sensor data to be shared with the requestor device 901.

Such sharing may occur locally at the receiving device 800 and/or the remotely at the evidentiary repository 108. Hence, at a block 1014, the receiving device 800 determines whether to share the subset of the sensor data locally and/or remotely, for example by determining whether to cause the subset of the sensor data to be shared with the requestor device 800 via the receiver device 800 or the evidentiary repository 108 based on one or more of: the status of the receiver device 800; a respective status of the subset of the sensor data; and a port (e.g. a logical port and/or a software port) at the receiver device 800 at which the request was received. In some embodiments, the subset of the sensor data is shared only locally or remotely, while in other embodiments, a combination of sharing locally and remotely may occur.

The decision on whether to share locally and/or remotely may depend on the status of the receiver device 800. For example, when the receiver device 800 is about to lose power due to a low battery (e.g. the power level of the battery 899 may be below a threshold value), the receiver device 800 may transmit the subset of the sensor data to the evidentiary repository 108 to cause the sharing of the subset of the sensor data to occur remotely. However, when the receiver device 800 has sufficient power and bandwidth and/or a wireless signal strength above respective given threshold values, the receiver device 800 cause the sharing of the subset of the sensor data to occur locally.

Similarly, when the receiving device 800 has already uploaded most of the subset of the sensor data to the evidentiary repository 108 (e.g. as determined from the amount of the subset of the sensor data transmitted to the evidentiary repository 108 being above a threshold value), the receiver device 800 may transmit the remainder of the subset of the sensor data to the evidentiary repository 108 to cause the sharing of the subset of the sensor data to occur remotely. However, when the receiving device 800 has not already uploaded most of the subset of the sensor data to the evidentiary repository 108 (e.g. as determined from the amount of the subset of the sensor data transmitted to the evidentiary repository 108 being below the threshold value), the receiver device 800 may cause the sharing of the subset of the sensor data to occur locally. The amount of the subset of the sensor data uploaded to the evidentiary repository 108 may be referred to as a status of the sensor data. However other types of status of the sensor data are within the scope of present embodiments, including, but not limited to, whether sensor data is signed (e.g. via an access token) or not.

Furthermore, a combination of remote and local sharing may occur. For example, when the receiving device 800 has already uploaded most of the subset of the sensor data to the evidentiary repository 108 (e.g. as determined from the amount of the subset of the sensor data transmitted to the evidentiary repository 108 being above a threshold value), and the battery level is above a threshold value, but bandwidth between the receiver device 800 and the evidentiary repository 108 is below a threshold value, the subset of the sensor data remaining at the receiver device 800 may be shared locally, while the subset of the sensor data already uploaded to the evidentiary repository may be shared remotely.

Furthermore, in some embodiments, the decision to share the subset of the sensor data locally and/or remotely may be determined based on a logical port and/or software port at the receiver device 800 at which the request was received. As used herein, the terms "logical port" and "software port" refers to a logical construct that identifies a specific process or a type of network service, and not a hardware port.

The port at which the request was received may further determine how the subset of the sensor data is shared with the requestor device 901. For example, the requestor device 901 may transmit the request to one of a port "3000", a port "3001" and a port "3002" at the receiving device 800. When the request is received at the port "3000", the receiving device 800 may share the subset of the sensor data locally via a web page generated using a webserver (and/or other type of content server) at the receiving device 800. When the request is received at the port "3001", the receiving device 800 may share the subset of the sensor data locally via a JavaScript Object Notation (JSON) file generated using an applications programming interface (API) at the receiving device 800. When the request is received at the port "3002", the receiving device 800 may share the subset of the sensor data remotely by uploading the subset of the sensor data to the evidentiary repository 108.

Hence, the requestor device 901 may control the mode that the receiving device 800 shares the subset of the sensor data and specifically may cause the receiving device 800 to share the subset of the sensor data remotely by uploading the subset of the sensor data to the evidentiary repository 108, as described in more detail below with respect to FIG. 18.

In any event, when the receiving device 800 determines that the subset of the sensor data is to be shared locally (e.g. a "LOCAL" decision at the block 1014), at a block 1016, the receiving device 800 shares the subset of the sensor data via one or more of a webserver, a content server, and an application programming interface at the receiver device 800. However, when the receiving device 800 determines that the subset of the sensor data is to be shared remotely (e.g. a "REMOTE" decision at the block 1014), at a block 1018, the receiving device 800 shares the subset of the sensor data via one or more of a webserver, a content server, and an application programming interface at the evidentiary repository 108. However, a combination of remote and local sharing may occur. Furthermore, such sharing may include digitally signing the subset of the sensor data prior to sharing.

Returning to the block 1010, when the one or more override contextual conditions does not meet the one or more override threshold conditions (e.g. a "NO" decision at the block 1010), at a block 1012, the receiving device 800 denies access to the subset of the sensor data by the requestor device 901, which may include, but is not limited to, transmitting a message to the requestor device 901 indicating that the request is denied.

The method 1000 will now be described in more detail with respect to FIG. 11 to FIG. 19, each of which are substantially similar to FIG. 9, with like elements having like numbers. It is further assumed in each of the FIG. 11 to FIG. 19 that the receiving device 800 is implementing the application 823 at the electronic processor 820.

Figure 11:
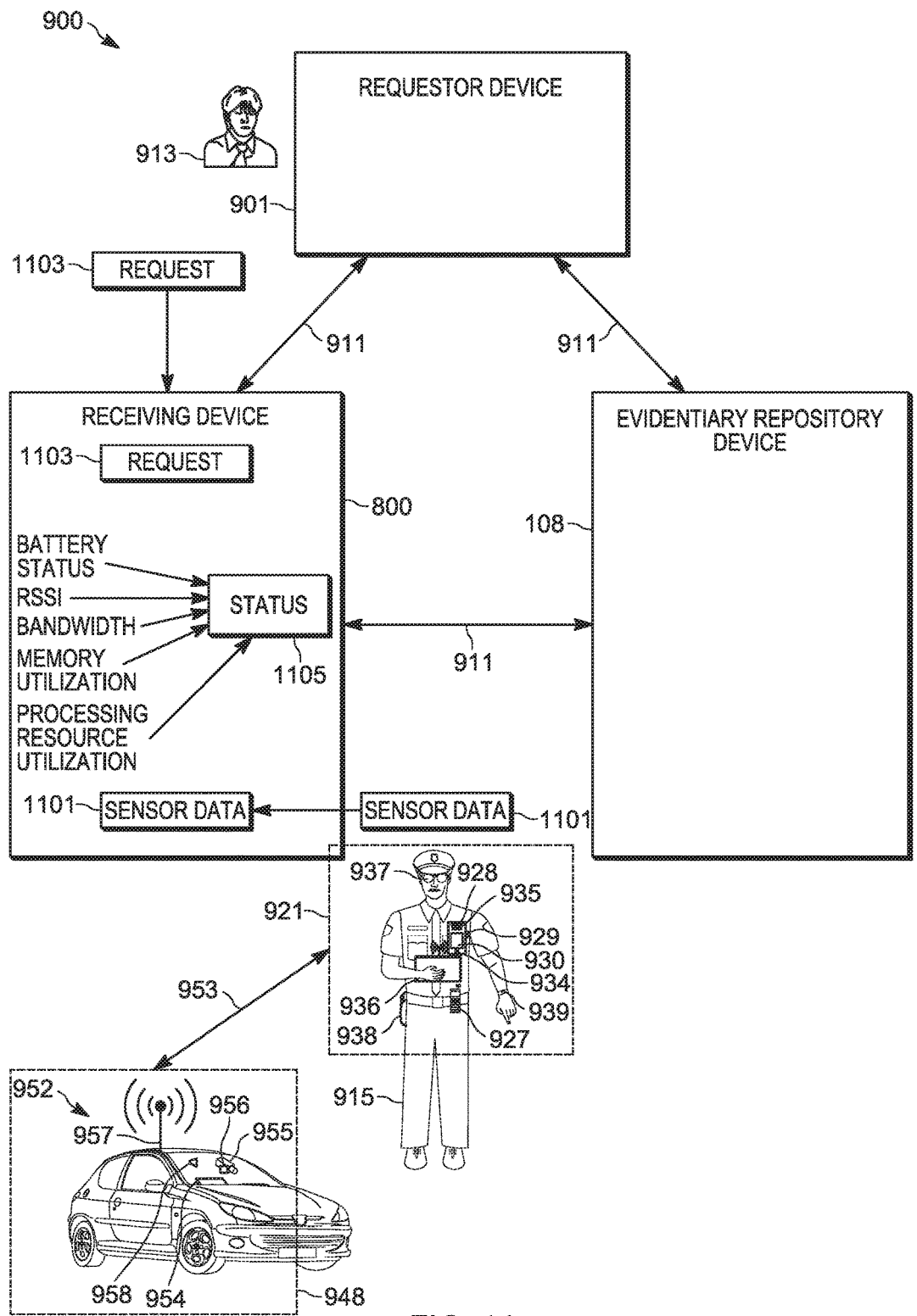
FIG. 11 depicts the receiving device of the system of FIG. 9 determining a status of the receiving device in accordance with some embodiments.

Attention is next directed to FIG. 11 which depicts an example embodiment of the block 1002, and the block 1004 of the method 1000. In particular, in FIG. 11, the receiving device 800 is receiving sensor data 1101 from the sensors at the personal area network 921 and/or the vehicle area network 948. While not depicted, the receiving device 800 may be periodically uploading the sensor data 1101 to the evidentiary repository 108.

Also depicted in FIG. 11, the requestor device 901 transmits, to the receiving device 800, a request 1103 to access the sensor data 1101. The receiving device 800 receives the request 1103 (e.g. at the block 1002 of the method 1000) and determines a status 1105 of the receiving device 800 (e.g. at the block 1004 of the method 1000). The status 1105 is generally in form of data representing the status and may be determined, as depicted, from one or more of battery status, wireless signal strength (e.g. received signal strength intensity (RSSI)), bandwidth, memory utilization and/or processing resource utilization.

Figure 12:
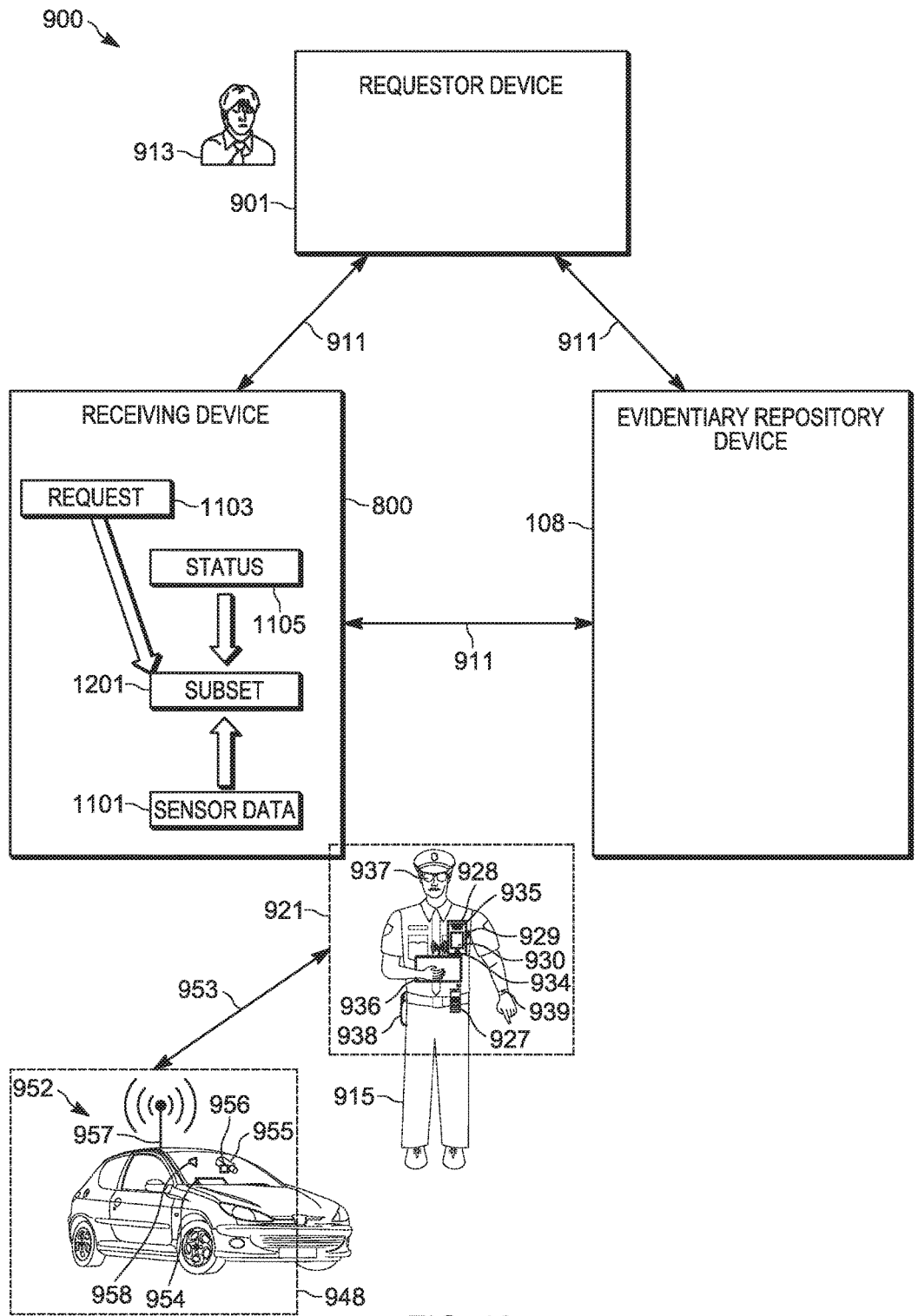
FIG. 12 depicts the receiving device of the system of FIG. 9 determining a subset of sensor data to share with a requestor device in accordance with some embodiments.

Attention is next directed to FIG. 12 which depicts an example embodiment of the block 1006 of the method 1000. In particular, in FIG. 12, the receiving device 800 is determining, from the status, a subset 1201 of the sensor data 1101 to be shared with the requestor device 901. The subset 1201 may comprise an amount of the sensor data 1101 that may be shared with the requestor device 901 within the boundaries defined by one or more of the battery status, the wireless signal strength, the bandwidth, the memory utilization, the processing resource utilization, and the like. The subset 1201 may be further based on a prioritization of the sensor data 1101 and/or attribute data of one or more of the receiving device 800 and the requestor device 901, as described above. Some attribute data associated with the requestor device 901 may be received with the request 1103; hence in FIG. 12, the request 1103 is depicted as contributing to determination of the subset 1201 of the sensor data 1101.

Figure 13:
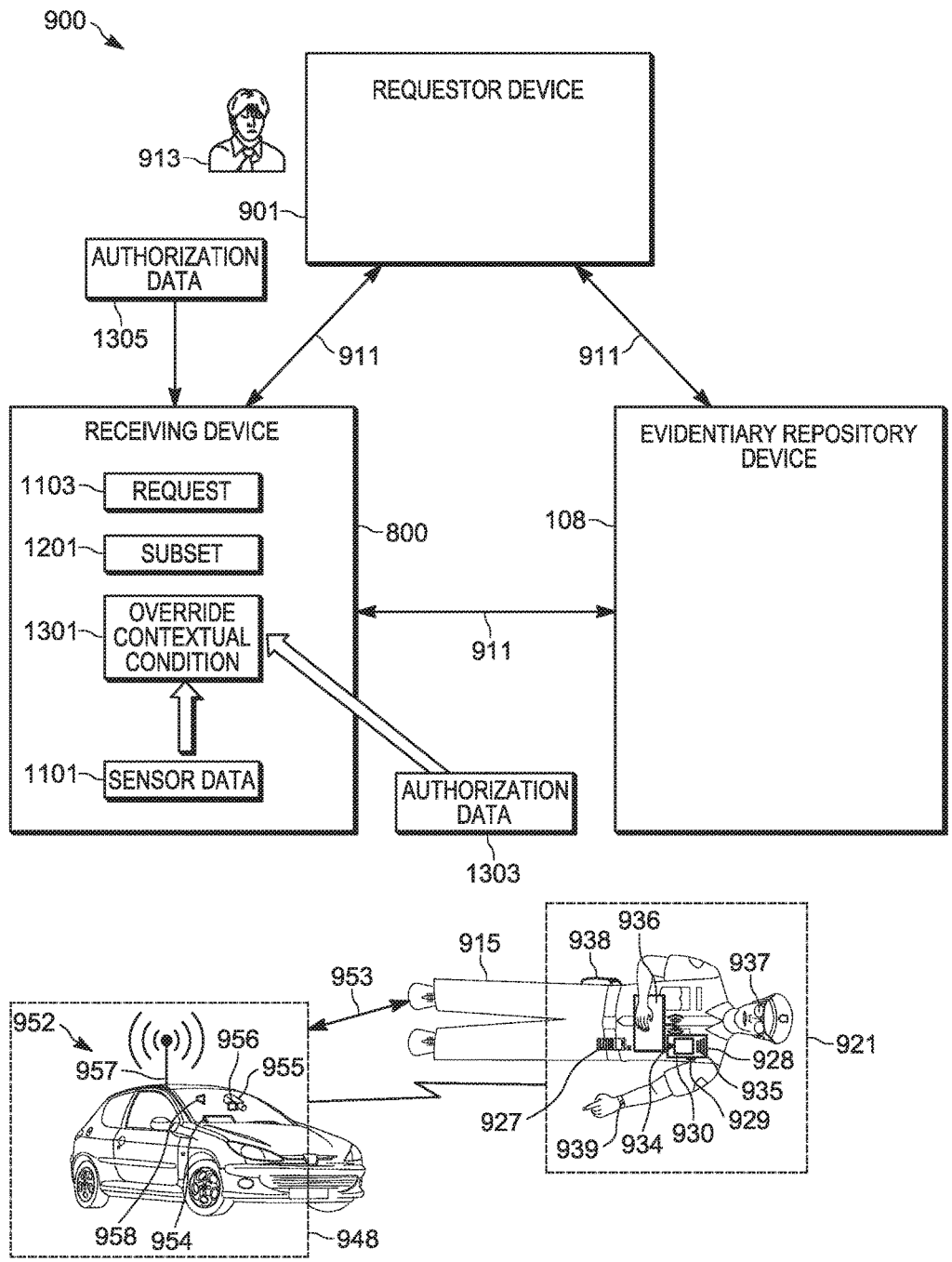
FIG. 13 depicts the receiving device of the system of FIG. 9 determining that an override contextual condition has been detected at the receiving device in accordance with some embodiments.

Attention is next directed to FIG. 13 which depicts an example embodiment of the block 1008 of the method 1000. In particular, the receiving device 800 determines whether a contextual override condition 1301 has been detected based on one or more of the sensor data 1101 and authorization data 1303, 1305 received from one or more of the input device 806 of the receiving device 800 and the requestor device 901 (e.g. via the respective link 911).

Indeed, as depicted in FIG. 13, the responder 915 has been incapacitated and/or is at least in a "man-down" condition. While not depicted a second responder, such as the user 913, may be interacting with the input device 806 of the receiving device 800 to provide the authorization data 1303.

Figure 14:
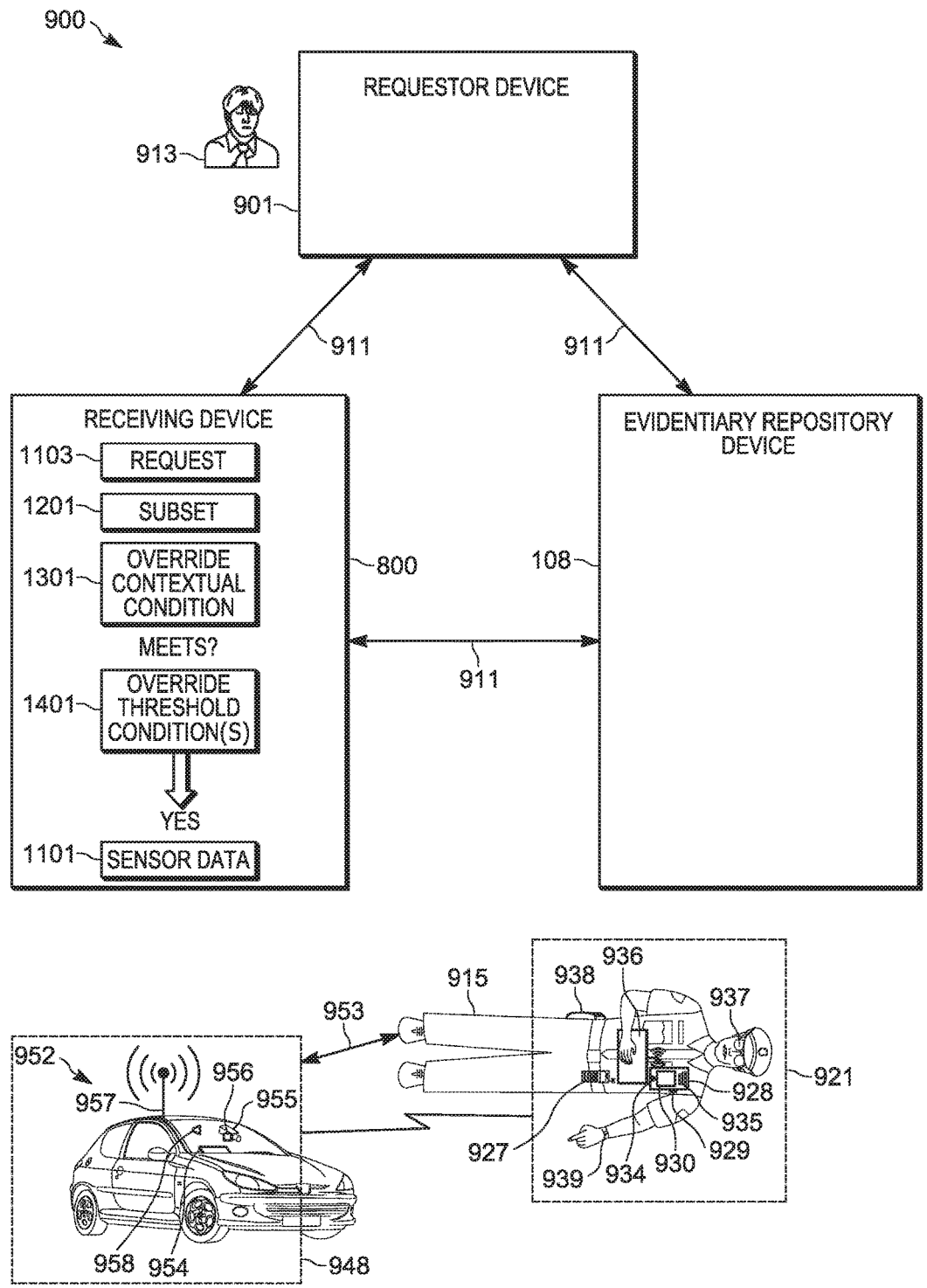
FIG. 14 depicts the receiving device of the system of FIG. 9 determining whether the override contextual condition meets one or more override threshold conditions in accordance with some embodiments.

Attention is next directed to FIG. 14 which depicts an example embodiment of the block 1010 of the method 1000. In particular, the receiving device 800 compares the contextual override condition 1301 to one or more override threshold conditions 1401. The contextual override condition 1301 may comprise any data that indicates that a contextual override condition is occurring at the receiving device 800. Similarly, the one or more override threshold conditions 1401 comprise any data that indicates that restricted access to the sensor data is to be overridden in order for the requestor device 901 to access at least the subset 1201 of the sensor data 1101, presuming that the contextual override condition 1301 meets the one or more override threshold conditions 1401. Such conditions are described in more detail above, however, as depicted, the contextual override condition 1301 comprises the responder 915 being incapacitated (as indicated by the sensor data 1101) and/or receipt of the authorization data 1303, 1305. Similarly, the one or more override threshold conditions 1401 comprises the man-down condition being detected, for example via a man-down sensor and/or a sensor-equipped vest of responder 915 being pierced; and/or the one or more override threshold conditions 1401 comprises the authorization data 1303, 1305 meeting an authorization threshold condition, such as a given number of sets of authorization data being received and/or the authorization data 1303, 1305 being associated with the user 913 being associated with a given organization and/or role and/or qualification and/or incident etc.

In any event, as depicted, the receiving device 800 determines that "YES" the contextual override condition 1301 meets the one or more override threshold conditions 1401. In other words, a "YES" decision occurs at the block 1010 of the method 1000. While not depicted, when a "NO" decision occurs at the block 1010 of the method 1000, the request 1103 is denied (e.g. at the block 1020 of the method 1000) and the receiving device 800 may transmit a denial of the request 1103 to the requestor device 901; such a denial of request may include data indicative of why the request 1103 was denied, such as the authorization data 1303, 1305 not meeting the one or more override threshold conditions 1401 and/or the responder 915 being "down" but not incapacitated (e.g. as determined from the sensor data 1101 and/or via the responder 915 interacting with the input device 806).

Figure 15:
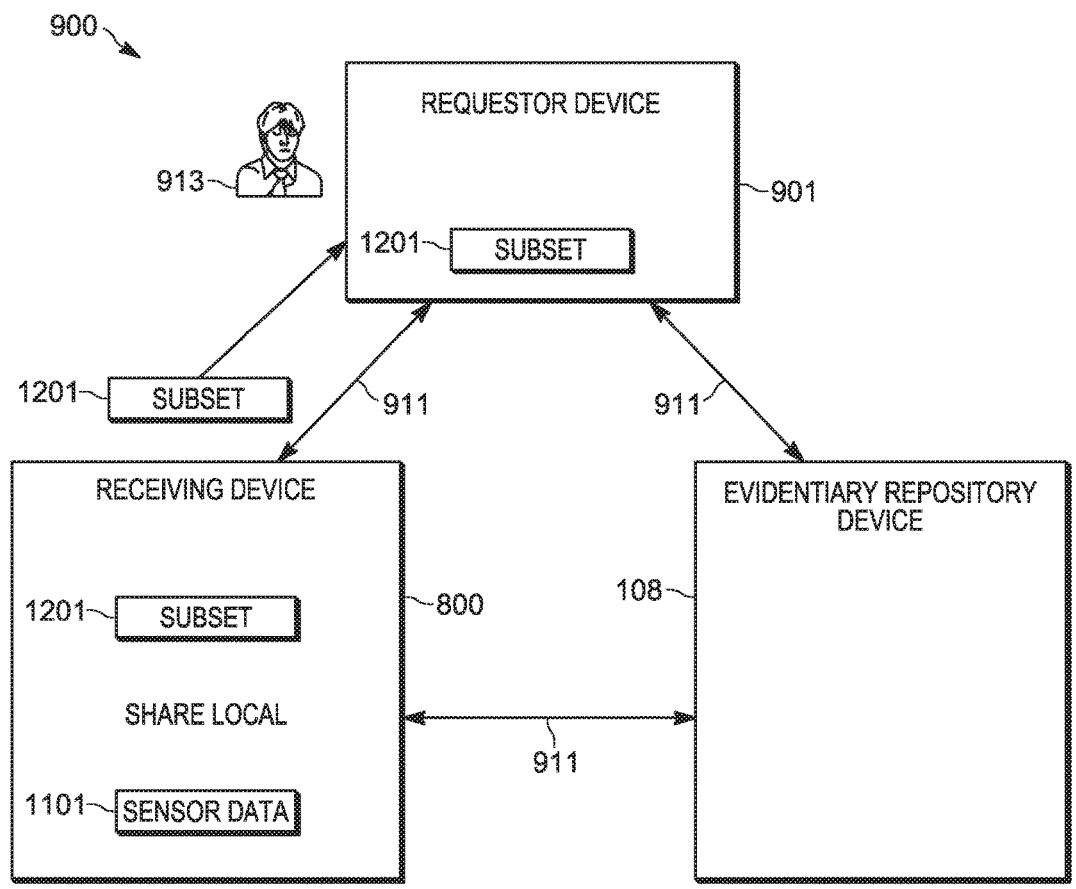
FIG. 15 depicts the receiving device of the system of FIG. 9 determining to share the subset of the sensor data locally by transmitting the subset of the sensor data to the requestor device in accordance with some embodiments.
Figure 15:
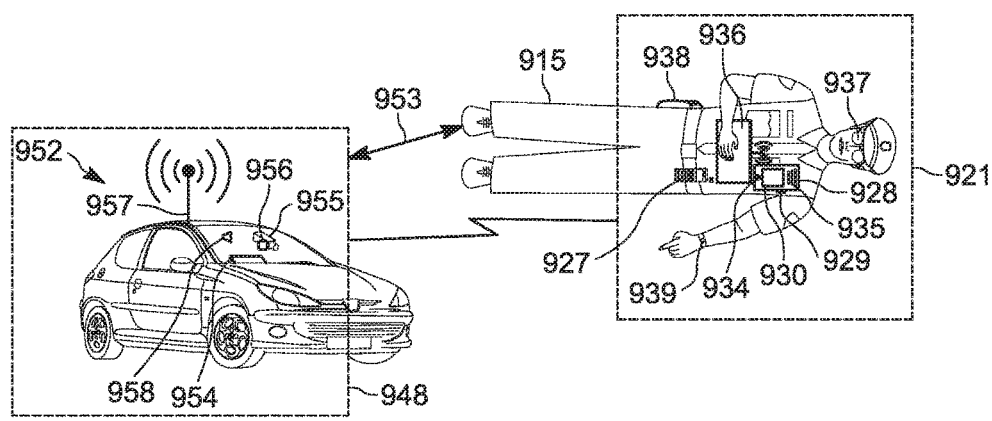

Attention is next directed to FIG. 15 which depicts an example embodiment of the block 1014 and the block 1016 of the method 1000. In particular, the receiving device 800 has determined that the subset 1201 of the sensor data 1101 is to be shared locally (e.g. via the receiving device 800) based on criteria described above. In the depicted example embodiment, the receiving device 800 transmits the subset 1201 of the sensor data 1101 to the requestor device 901, where the subset 1201 is received. The subset 1201 may then be examined at the requestor device 901, for example by the user 913.

Figure 16:
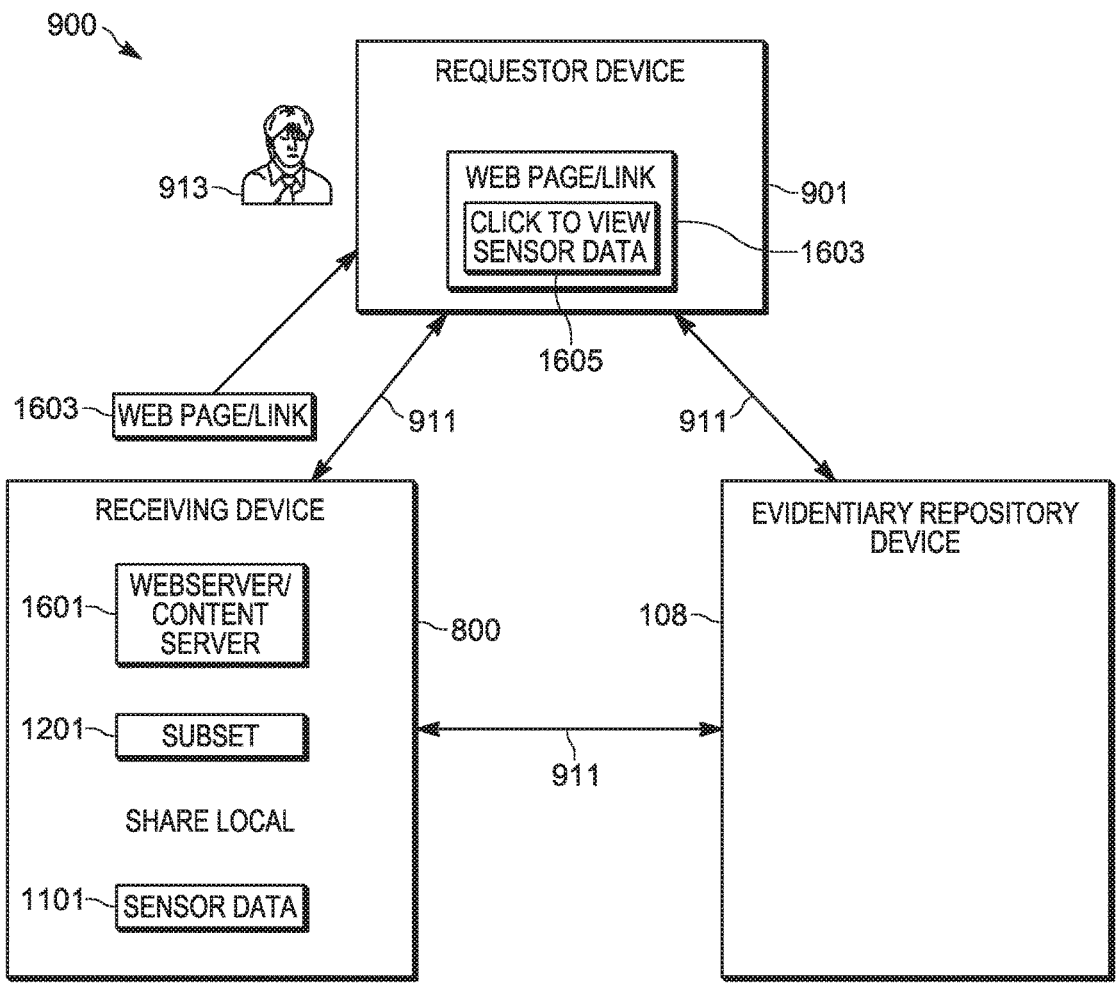
FIG. 16 depicts the receiving device of the system of FIG. 9 determining to share the subset of the sensor data locally by providing the subset of the sensor data to the requestor device via a webserver and/or a content server in accordance with some embodiments.
Figure 16:
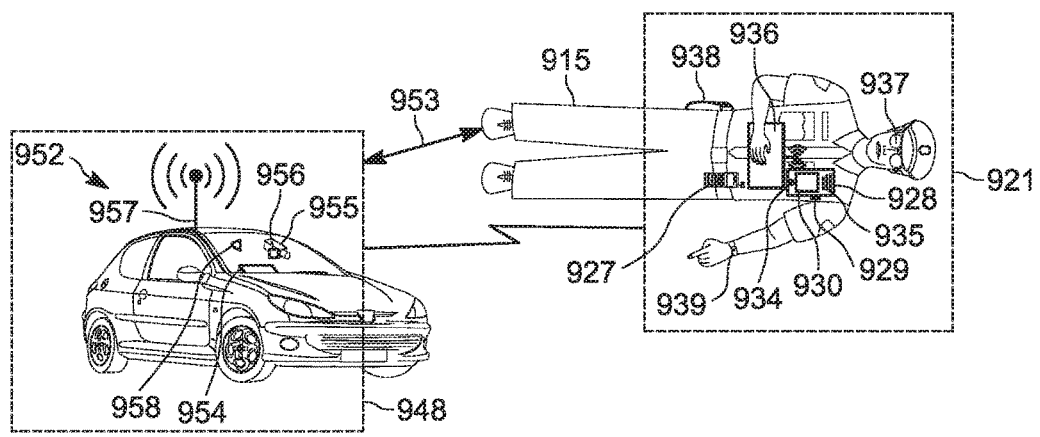

Attention is next directed to FIG. 16 which depicts another example embodiment of the block 1014 and the block 1016 of the method 1000. In particular, the receiving device 800 has determined that the subset 1201 of the sensor data 1101 is to be shared locally (e.g. via the receiving device 800) based on criteria described above. In the depicted example embodiment, the receiving device 800 provides a webserver 1601 (and/or a content server) which may be generated using the application 823 and/or any an application at the receiving device 800 used to generate a webserver and/or a content server. The receiving device 800 further transmits data 1603 for accessing the webserver 1601 (and/or the content server) to the requestor device 901. As depicted, for example, the data 1603 comprises a webpage and/or a link (e.g. a Uniform Resource Locator (URL) to the subset 1201 and may be provided at a browser application of the requestor device 901 at a display screen. Indeed, as depicted, the webpage of the data 1603 includes a virtual button 1605 which, when activated using an input device of the requestor device 901, causes the webpage to request the subset 1201 from the receiving device 800 via the webserver 1601 (and/or the content server), which then returns the subset 1201 in another webpage, and the like. Alternatively, the data 1603 includes the subset 1201.

Alternatively, the user 913 may not interact directly with the webpage; rather, each of the devices 800, 901 may include associated service accounts, which may cause the subset 1201 to be retrieved automatically and provided at the requestor device 901.

Figure 17:
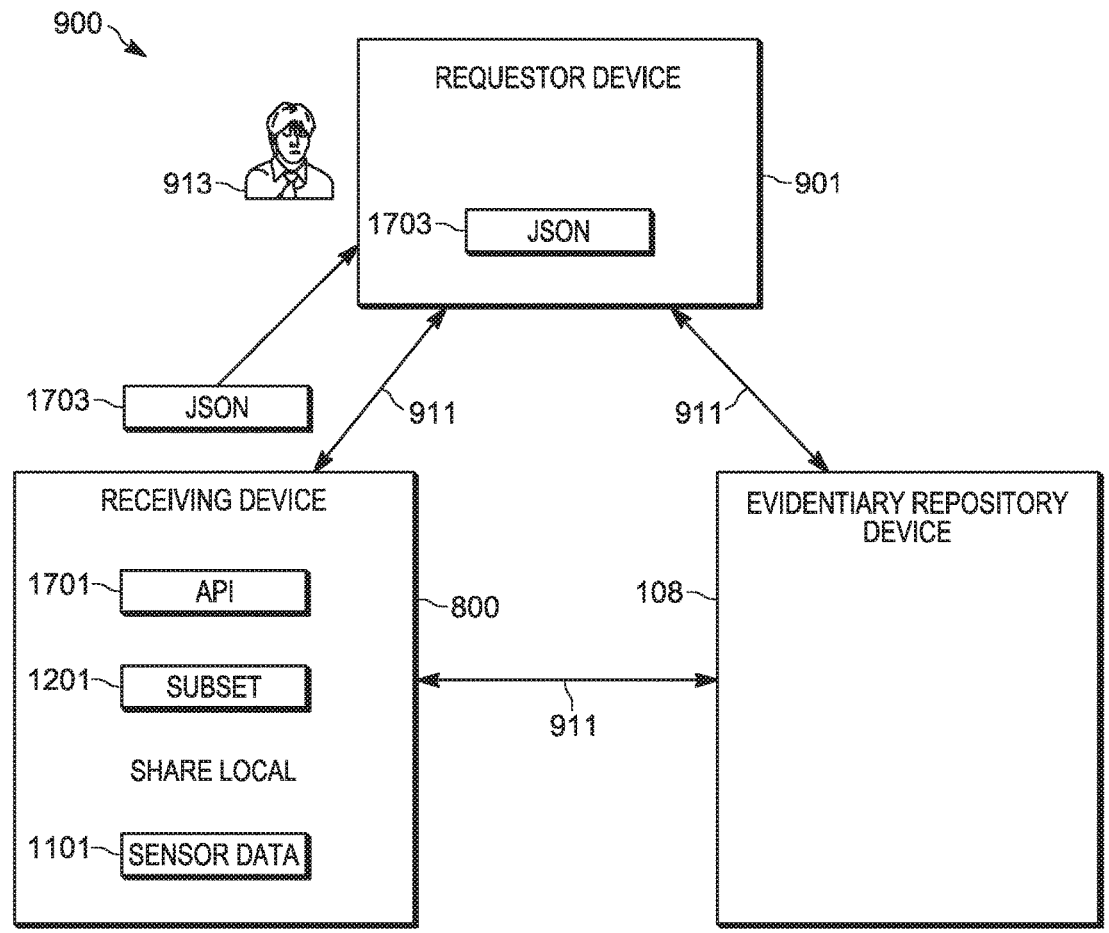
FIG. 17 depicts the receiving device of the system of FIG. 9 determining to share the subset of the sensor data locally by providing the subset of the sensor data to the requestor device via an application programming interface in accordance with some embodiments.
Figure 17:
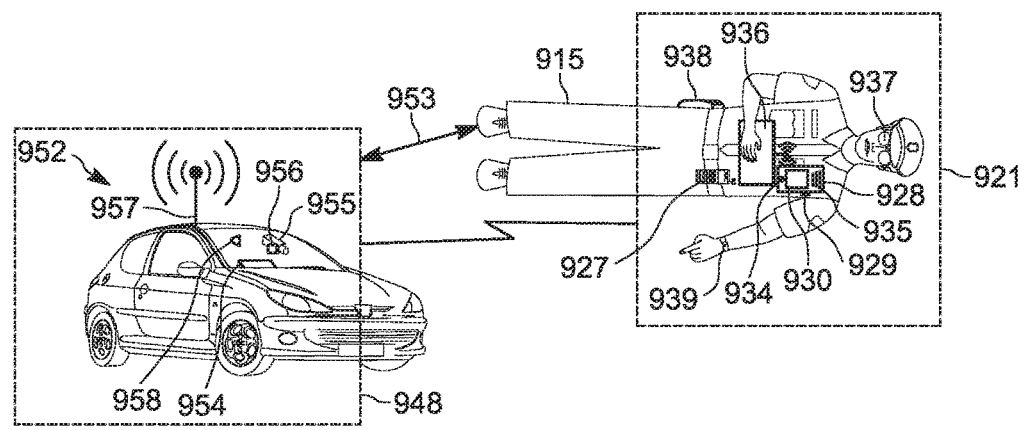

Attention is next directed to FIG. 17 which depicts another example embodiment of the block 1014 and the block 1016 of the method 1000. In particular, the receiving device 800 has determined that the subset 1201 of the sensor data 1101 is to be shared locally (e.g. via the receiving device 800) based on criteria described above. In the depicted example embodiment, the receiving device 800 provides an application data interface 1701 which may be generated using the application 823 and/or any an application at the receiving device 800 used to generate an application data interface. The receiving device 800 further transmits data 1703 for accessing the subset 1201 via the application data interface 1701 to the requestor device 901. As depicted, for example, the data 1703 comprises JavaScript Object Notation (JSON) data which may be processed by an application at the requestor device 901 to retrieve the subset 1201 via the application data interface 1701. Alternatively, the data 1703 may include the subset 1201.

Hence, in FIGS. 16 and 17, the block 1016 of the method 1000 may include causing the subset 1201 of the sensor data 1101 to be shared with the requestor device 901 by: providing one or more of a webserver, a content server, and an application programming interface (API) at the receiver device 800; and transmitting data for accessing the subset 1201 via the one or more of the webserver, the content server, and the application programming interface to the requestor device 901.

These embodiments may further include an authorization and/or authentication process in which the requestor device 901 is authorized and/or authenticated with the webserver 1601 (and/or the content server) and/or the application data interface 1701. For example, such authentication may occur at the webserver 1601 (and/or the content server) via certificates for example when each of the devices 800, 901 include service accounts. Alternatively, such authentication may occur at webserver 1601 (and/or the content server) via one or more of OpenID Connect (OIDC) and Security Assertion Markup Language (SAML), in particular when the user 913 is interacting with a webpage. Alternatively, such authentication may occur at the application data interface 1701 via access tokens.

Figure 18:
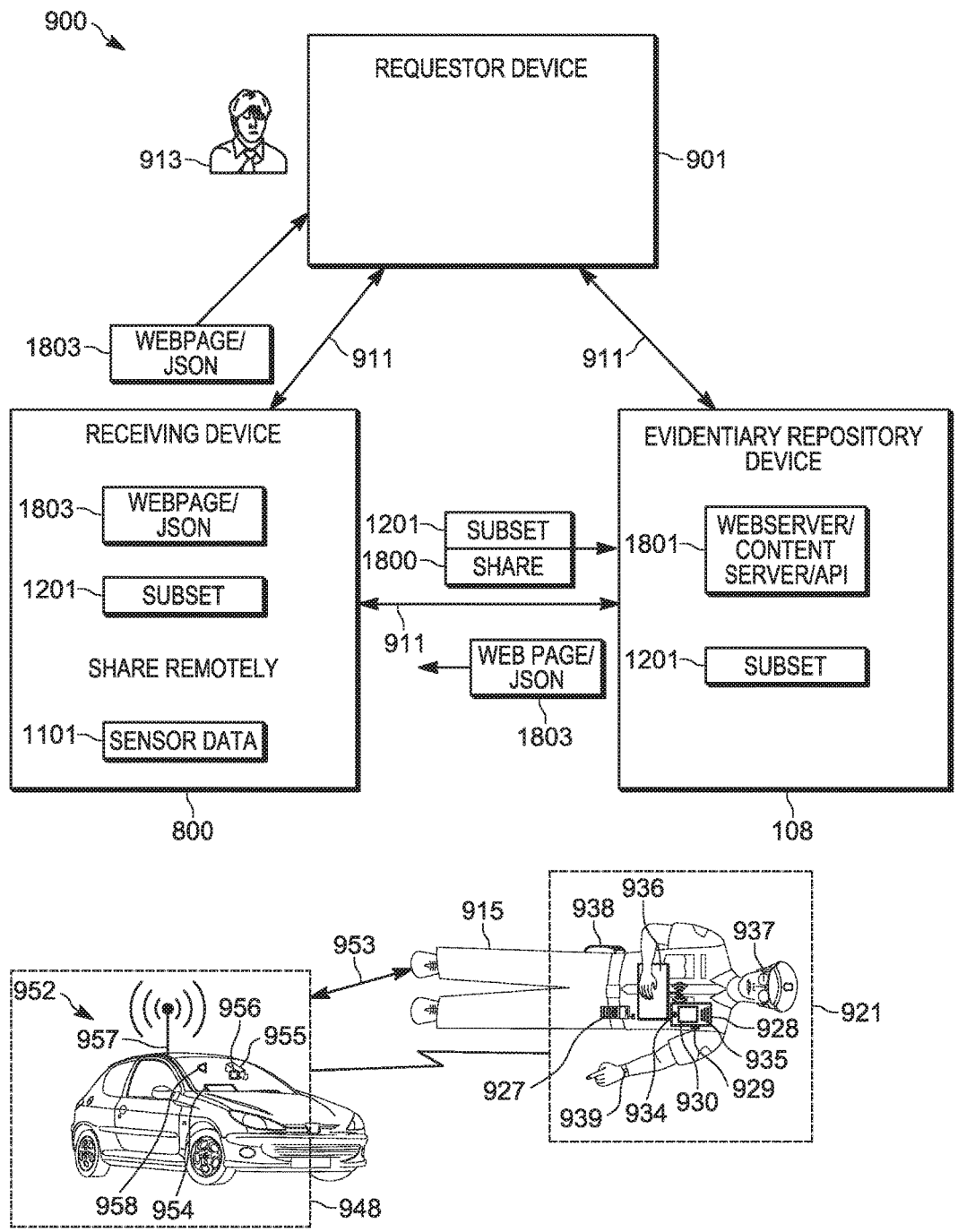
FIG. 18 depicts the receiving device of the system of FIG. 9 determining to share the subset of the sensor data remotely by transmitting the subset of the sensor data to an evidentiary repository and transmitting data for accessing the subset of the sensor data at the evidentiary repository to the requestor device in accordance with some embodiments.

Attention is next directed to FIG. 18 which depicts an example embodiment of the block 1014 and the block 1018 of the method 1000. In particular, the receiving device 800 has determined that the subset 1201 of the sensor data 1101 is to be shared remotely (e.g. via the evidentiary repository 108) based on criteria described above. In the depicted example embodiment, the receiving device 800 provides transmits the subset 1201 to the evidentiary repository 108 for storage. Such a transmission may be in addition to (e.g. prior to, and/or concurrently with), a formal "post incident upload" of the sensor data 1101 to the evidentiary repository 108 for storage; put another way, the transmission of the subset 1201 of the sensor data 1101 to the evidentiary repository 108, depicted in FIG. 18, is performed in response to receiving the request 1103, and when the one or more override contextual conditions 1301 meets the one or more override threshold conditions 1401.

As depicted, the subset 1201 is transmitted with a share command 1800 indicating that the subset 1201 is to be shared with the requestor device 901; the share command 1800 may include an identifier of the requestor device 901 (e.g. as received with the request 1103 and which may include, but is not limited to an internet protocol address of the requestor device 901, a media access control (MAC) address of the requestor device 901, an identifier of the user 913 that is also associated with the requestor device 901 and the like, a telephone number of the requestor device 901, an email address associated with the requestor device 901, and the like).

The evidentiary repository 108 provides one or more of a webserver, a content server, and an application programming interface 1801 for accessing the subset 1201 (e.g. which may be generated using an application 823 for generating one or more of a webserver, a content server, and an application programming interface, at the evidentiary repository 108). The evidentiary repository 108 further transmits data 1803 for accessing the subset 1201 via the one or more of the webserver, the content server, and the application programming interface 1801 to the receiving device 800 which transmits the data 1803 to the requestor device 901. The data 1803 may be similar to the data 1603 and/or the data 1703. The requestor device 901 may then access the subset 1201 via the evidentiary repository 108. Furthermore, an authorization and/or authentication process, as described above with respect to FIG. 16 and FIG. 17, may also occur in these embodiments.

Hence, in FIG. 18, the block 1018 of the method 1000 may include causing the subset 1201 of the sensor data 1101 to be shared with the requestor device 901 by: transmitting at least the subset 1201 of the sensor data 1101 to the evidentiary repository 108 for storage; receiving data 1803 for accessing the subset 1201 via one or more of a webserver, a content server, and an application programming interface at the evidentiary repository 108; and transmitting the data 1803 for accessing the subset 1201 via one or more of the webserver, the content server, and the application programming interface at the evidentiary repository 108 to the requestor device 901.

Figure 19:
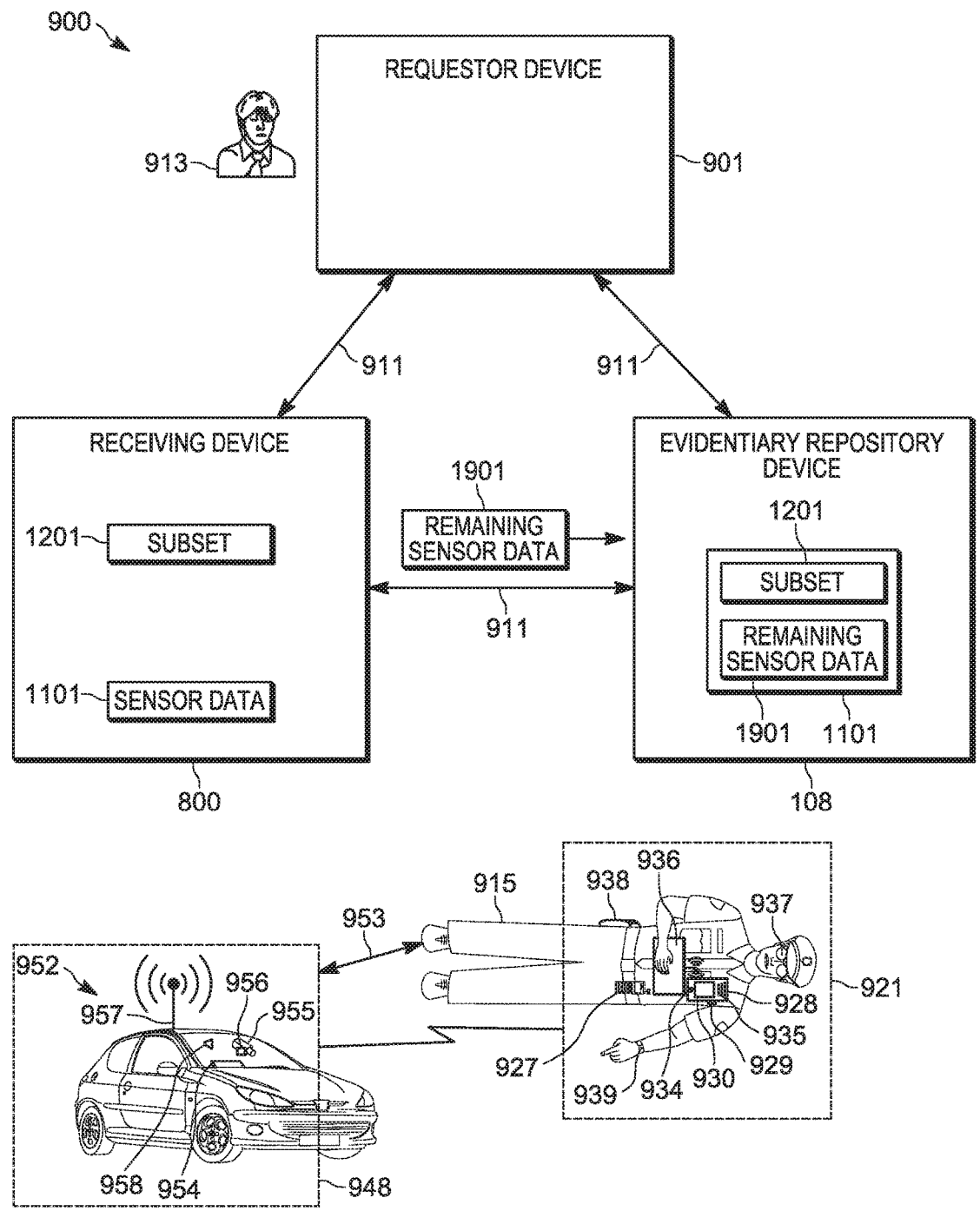
FIG. 19 depicts the receiving device of the system of FIG. 9 reconciling the sensor data stored at the receiving device and the evidentiary repository in accordance with some embodiments.

In embodiments where the subset 1201 of the sensor data 1101 is transmitted to the evidentiary repository 108, for example via implementation of the block 1018 of the method 1000, the receiving device 800 generally also reconciles the subset 1201 of the sensor data 1101 stored at the receiving device 800 with any sensor data stored at the evidentiary repository device 108. For example, as depicted in FIG. 19, the receiving device 800 has transmitted the subset 1201 of the sensor data 1101 to the evidentiary repository 108 for storage at least in the embodiment of FIG. 18, and then later reconciles the sensor data 1101 stored at the receiving device 800 with the subset 1201 stored at the evidentiary repository 108 by transmitting remaining sensor data 1901 to the evidentiary repository 108 for storage, such that the subset 1201 and the remaining sensor data 1901 together form the sensor data 1101 stored at the evidentiary repository 108.

Provided herein is a device, system and method for sharing sensor data, for example when access to the sensor data is restricted. In particular, override contextual conditions are detected at a receiving device, and when the override contextual conditions meet one or more override threshold conditions, a subset of the sensor data is shared with a requestor device. Put another way, restrictions to the sensor data are overridden to provide the requestor device with access to the subset of the sensor data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   receiving, at a receiver device, from a requestor device, a request to access sensor data acquired by sensors associated with the receiver device;
   determining, at the receiver device, a status of the receiver device;
   determining, at the receiver device, from the status of the receiver device, a subset of the sensor data to share with the requestor device;
   determining, at the receiver device, one or more override contextual conditions associated with one or more of the requestor device and the receiver device; and
   when the one or more override contextual conditions meets one or more override threshold conditions, causing the subset of the sensor data to be shared with the requestor device.

2. The method of claim 1, wherein the status of the receiver device comprises one or more of:
   a status of a battery of the receiver device;
   a wireless signal strength at the receiver device;
   a bandwidth of the receiver device;
   a memory utilization of the receiver device; and
   processing resource utilization of the receiver device.

3. The method of claim 1, wherein the one or more override contextual conditions associated with one or more of the requestor device and the receiver device is determined from one or more of:
   biometric sensor data from a biometric sensor device associated with the receiver device;
   man-down sensor data from a man-down sensor device associated with the receiver device;
   incident data associated with one or more of the requestor device and the receiver device; and
   at least one set of authorization data received at the receiving device.

4. The method of claim 1, further comprising:
   determining the subset of the sensor data to share with the requestor device based on a combination of the status of the receiver device and one or more of: a respective status of the sensor data; and attribute data received from the requestor device.

5. The method of claim 4, wherein the attribute data comprises one or more of:
   an organization associated with a user of the requestor device;
   qualifications associated with the user of the requestor device;
   a role associated with the user of the requestor device;
   an incident assignment associated with the user of the requestor device;
   an assignment of the sensor data;
   a location of the user of the requestor device;
   and a time the request was received.

6. The method of claim 1, further comprising:
   determining whether to cause the subset of the sensor data to be shared with the requestor device via the receiver device or an evidentiary repository device based on one or more of: the status of the receiver device; a respective status of the subset of the sensor data; and a port the receiver device at which the request was received.

7. The method of claim 1, wherein causing the subset of the sensor data to be shared with the requestor device comprises:
   providing one or more of a webserver, a content server, and an application programming interface (API) at the receiver device; and
   transmitting data for accessing the subset via one or more of the webserver, the content server, and the application programming interface to the requestor device.

8. The method of claim 1, wherein causing the subset of the sensor data to be shared with the requestor device comprises:
   transmitting at least the subset of the sensor data to the requestor device.

9. The method of claim 1, wherein causing the subset of the sensor data to be shared with the requestor device comprises:
   transmitting at least the subset of the sensor data to an evidentiary repository device for storage;
   receiving data for accessing the subset via one or more of a webserver, a content server, and an application programming interface (API) at the evidentiary repository device; and
   transmitting the data for accessing the subset via one or more of the webserver, the content server, and the application programming interface at the evidentiary repository device to the requestor device.

10. The method of claim 1, further comprising:
    transmitting at least the subset of the sensor data to an evidentiary repository device; and
    reconciling at least the subset of the sensor data stored at the receiving device with any sensor data stored at the evidentiary repository device.

11. A receiver device comprising:
    an electronic processor communicatively coupled to a communications unit, the electronic processor configured to:

receive, via the communications unit, from a requestor device, a request to access sensor data acquired by sensors associated with the receiver device;

determine a status of the receiver device;

determine, from the status of the receiver device, a subset of the sensor data to share with the requestor device;

determine one or more override contextual conditions associated with one or more of the requestor device and the receiver device; and when the one or more override contextual conditions meets one or more override threshold conditions, cause the subset of the sensor data to be shared with the requestor device.

12. The receiving device of claim 11, wherein the status of the receiver device comprises one or more of:

a status of a battery of the receiver device;

a wireless signal strength at the receiver device;

a bandwidth of the receiver device;

a memory utilization of the receiver device; and processing resource utilization of the receiver device.

13. The receiving device of claim 11, wherein the one or more override contextual conditions associated with one or more of the requestor device and the receiver device is determined from one or more of:

biometric sensor data from a biometric sensor device associated with the receiver device;

man-down sensor data from a man-down sensor device associated with the receiver device;

incident data associated with one or more of the requestor device and the receiver device; and at least one set of authorization data received at the receiving device.

14. The receiving device of claim 11, wherein the electronic processor is further configured to:

determine the subset of the sensor data to share with the requestor device based on a combination of the status of the receiver device and one or more of: a respective status of the sensor data; and attribute data received from the requestor device.

15. The receiving device of claim 14, wherein the attribute data comprises one or more of:

an organization associated with a user of the requestor device;

qualifications associated with the user of the requestor device;

a role associated with the user of the requestor device;

an incident assignment associated with the user of the requestor device;

an assignment of the sensor data;

a location of the user of the requestor device;

and a time the request was received.

16. The receiving device of claim 11, wherein the electronic processor is further configured to:

determine whether to cause the subset of the sensor data to be shared with the requestor device via the receiver device or an evidentiary repository device based on one or more of: the status of the receiver device; a respective status of the subset of the sensor data; and a port the receiver device at which the request was received.

17. The receiving device of claim 11, wherein the electronic processor is further configured to cause the subset of the sensor data to be shared with the requestor device by:

providing one or more of a webserver, a content server, and an application programming interface (API) at the receiver device; and transmitting data for accessing the subset via one or more of the webserver, the content server, and the application programming interface to the requestor device.

18. The receiving device of claim 11, wherein the electronic processor is further configured to cause the subset of the sensor data to be shared with the requestor device by:

transmitting at least the subset of the sensor data to the requestor device.

19. The receiving device of claim 11, wherein the electronic processor is further configured to cause the subset of the sensor data to be shared with the requestor device by:

transmitting at least the subset of the sensor data to an evidentiary repository device for storage;

receiving data for accessing the subset via one or more of a webserver, a content server, and an application programming interface (API) at the evidentiary repository device; and transmitting the data for accessing the subset via one or more of the webserver, the content server, and the application programming interface at the evidentiary repository device to the requestor device.

20. The receiving device of claim 11, wherein the electronic processor is further configured to:

transmit at least the subset of the sensor data to an evidentiary repository device; and reconcile at least the subset of the sensor data stored at the receiving device with any sensor data stored at the evidentiary repository device.

* * * * *